United States Patent
Robichaux et al.

(10) Patent No.: US 9,567,810 B2
(45) Date of Patent: *Feb. 14, 2017

(54) DOUBLE SWIVEL APPARATUS AND METHOD

(71) Applicant: Mako Rentals, Inc., Houma, LA (US)

(72) Inventors: Kip M. Robichaux, Houma, LA (US); Terry P. Robichaux, Houma, LA (US); Kenneth G. Caillouet, Thibodaux, LA (US); Donny Logan, Bourg, LA (US)

(73) Assignee: Mako Rentals, Inc., Houma, LA (US)

( * ) Notice: Subject to any disclaimer, the term of this patent is extended or adjusted under 35 U.S.C. 154(b) by 68 days.

This patent is subject to a terminal disclaimer.

(21) Appl. No.: 14/282,952

(22) Filed: May 20, 2014

(65) Prior Publication Data

US 2014/0332230 A1 Nov. 13, 2014

Related U.S. Application Data

(63) Continuation of application No. 13/855,187, filed on Apr. 2, 2013, now Pat. No. 8,726,994, which is a continuation of application No. 13/526,672, filed on Jun. 19, 2012, now Pat. No. 8,408,302, which is a continuation of application No. 13/286,676, filed on
(Continued)

(51) Int. Cl.
| | |
|---|---|
| *E21B 33/16* | (2006.01) |
| *E21B 17/05* | (2006.01) |
| *E21B 33/05* | (2006.01) |
| *E21B 21/00* | (2006.01) |
| *E21B 21/02* | (2006.01) |

(Continued)

(52) U.S. Cl.
CPC .............. *E21B 17/05* (2013.01); *E21B 21/00* (2013.01); *E21B 21/02* (2013.01); *E21B 33/0415* (2013.01); *E21B 33/05* (2013.01); *F16L 27/087* (2013.01)

(58) Field of Classification Search
CPC ...................................................... E21B 33/16
See application file for complete search history.

(56) References Cited

U.S. PATENT DOCUMENTS

| | | |
|---|---|---|
| 1,704,053 A | 3/1925 | Miller |
| 2,113,647 A | 4/1938 | Davidson et al. |

(Continued)

*Primary Examiner* — John Kreck
(74) *Attorney, Agent, or Firm* — Garvey, Smith, Nehrbass & North LLC; Brett A. North

(57) ABSTRACT

A double swivel for use with a top drive power unit supported for connection with a well string in a well bore to selectively impart longitudinal and/or rotational movement to the well string, a feeder for supplying a pumpable substance such as cement and the like from an external supply source to the interior of the well string in the well bore without first discharging it through the top drive power unit including a mandrel extending through double sleeves which are sealably and rotatably supported thereon for relative rotation between the sleeves and mandrel. The mandrel and sleeves have flow passages for communicating the pumpable substance from an external source to discharge through the sleeve and mandrel and into the interior of the well string below the top drive power unit. The unit can include a packing injection system, clamp, and novel packing configuration. In an alternative embodiment the unit can include a plug or ball insertion tool.

20 Claims, 12 Drawing Sheets

Related U.S. Application Data

Nov. 1, 2011, now Pat. No. 8,201,627, which is a continuation of application No. 12/413,636, filed on Mar. 30, 2009, now Pat. No. 8,047,290, which is a continuation of application No. 11/975,131, filed on Oct. 16, 2007, now Pat. No. 7,510,007, which is a continuation of application No. 11/334,083, filed on Jan. 17, 2006, now Pat. No. 7,281,582, which is a continuation-in-part of application No. 10/658,092, filed on Sep. 9, 2003, now Pat. No. 7,007,753.

(60) Provisional application No. 60/409,177, filed on Sep. 9, 2002, provisional application No. 60/644,683, filed on Jan. 19, 2005.

(51) Int. Cl.
 *F16L 27/087* (2006.01)
 *E21B 33/04* (2006.01)

(56) References Cited

U.S. PATENT DOCUMENTS

| | | |
|---|---|---|
| RE21,677 E | 12/1940 | Tremolada |
| 2,713,909 A | 7/1955 | Baker |
| 2,961,045 A | 11/1960 | Stogner et al. |
| 2,961,046 A | 11/1960 | Moeller et al. |
| 3,403,729 A | 10/1968 | Hickey |
| 3,616,850 A | 11/1971 | Scott |
| 3,720,264 A | 3/1973 | Hutchison |
| 3,750,749 A | 8/1973 | Giroux |
| 3,850,241 A | 11/1974 | Hutchinson |
| 4,219,087 A | 8/1980 | Johnson |
| 4,317,486 A | 3/1982 | Harris |
| 4,418,947 A | 12/1983 | Talafuse |
| 4,427,065 A | 1/1984 | Watson |
| 4,624,312 A | 11/1986 | McMullin |
| 4,671,353 A | 6/1987 | Daming |
| 4,722,389 A | 2/1988 | Arnold |
| 4,854,383 A | 8/1989 | Arnold et al. |
| RE33,150 E | 1/1990 | Boyd |
| 4,907,649 A | 3/1990 | Bode |
| 4,917,184 A | 4/1990 | Freeman et al. |
| 4,995,457 A | 2/1991 | Baldridge |
| 5,095,988 A | 3/1992 | Bode |
| 5,205,359 A | 4/1993 | Stephenson |
| 5,236,035 A | 8/1993 | Brisco et al. |
| 5,277,248 A | 1/1994 | Breland |
| 5,293,933 A | 3/1994 | Brisco |
| 5,435,390 A | 7/1995 | Baugh et al. |
| 5,443,122 A | 8/1995 | Brisco |
| 5,494,107 A | 2/1996 | Bode |
| 5,722,491 A | 3/1998 | Sullaway et al. |
| 5,829,523 A | 11/1998 | North |
| 5,833,002 A | 11/1998 | Holcombe |
| 5,890,537 A | 4/1999 | Lavaure et al. |
| 5,950,724 A | 9/1999 | Giebeler |
| 6,206,095 B1 | 3/2001 | Baugh |
| 6,575,238 B1 | 6/2003 | Yokley |
| 7,007,753 B2 | 3/2006 | Robichaux et al. |
| 8,726,994 B2 * | 5/2014 | Robichaux ............. E21B 17/05 166/177.4 |
| 2004/0035574 A1 | 2/2004 | Rippert |
| 2005/0039925 A1 | 2/2005 | Connell |

\* cited by examiner

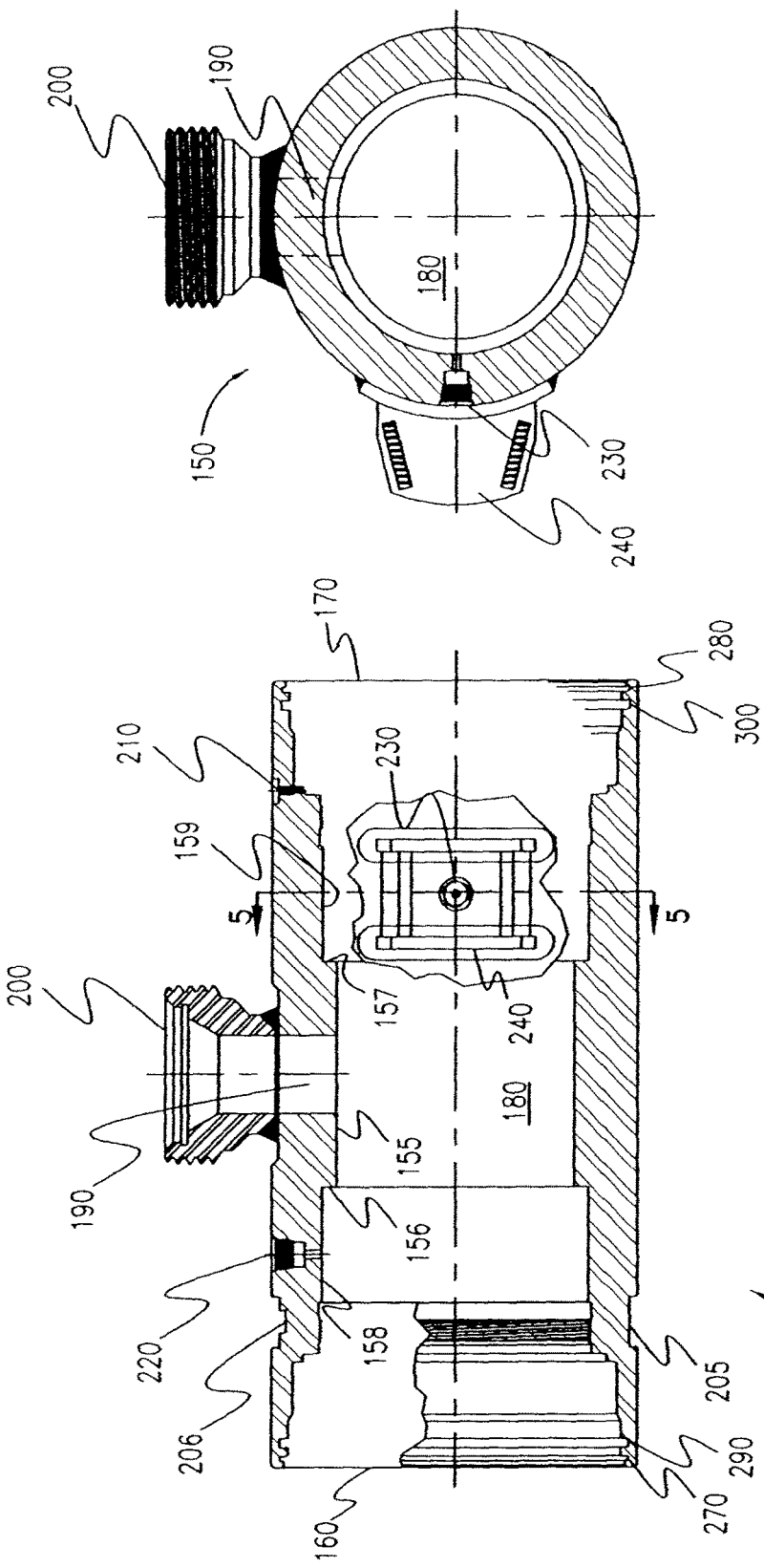

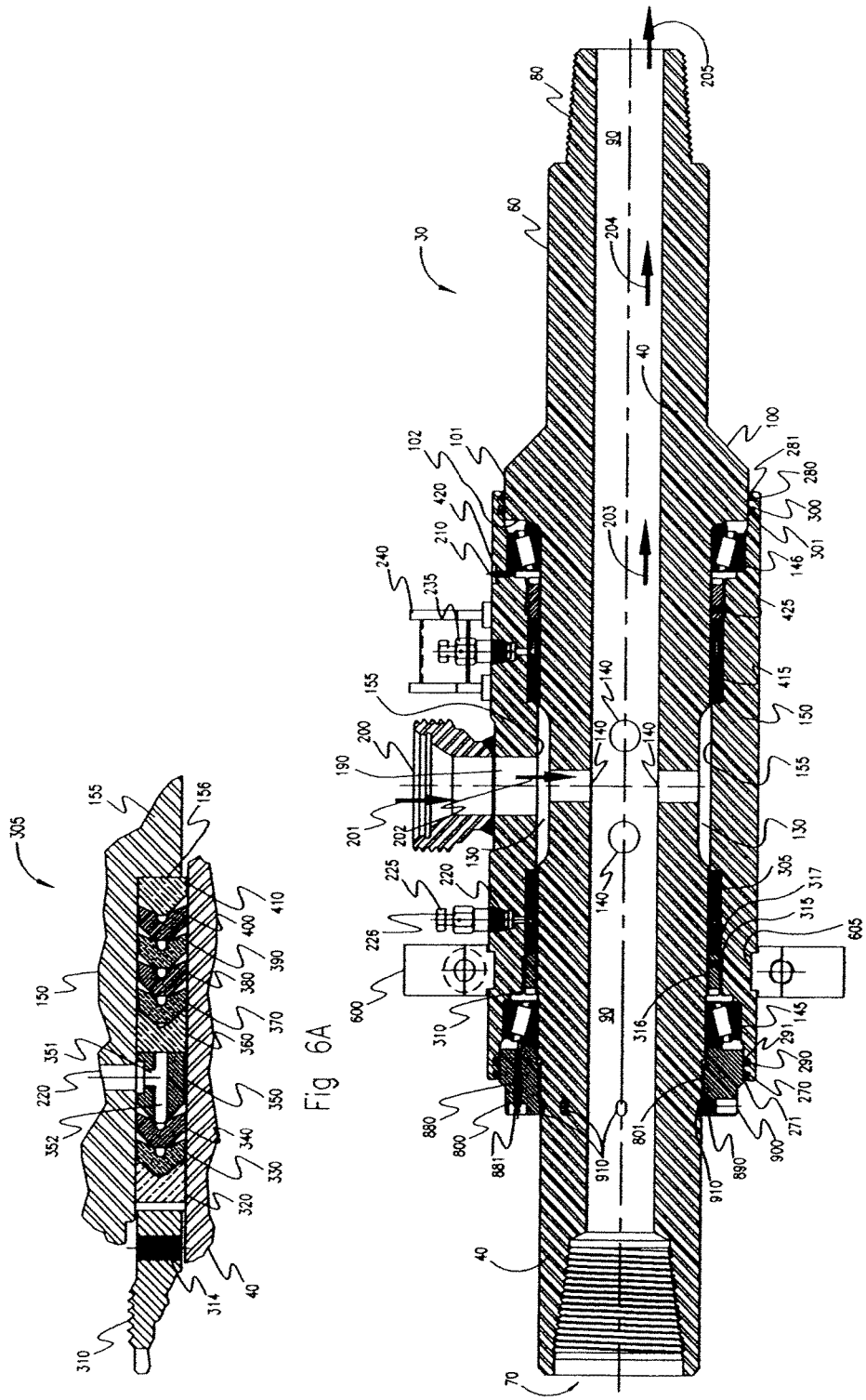

DOUBLE SWIVEL APPARATUS AND METHOD

CROSS-REFERENCE TO RELATED APPLICATIONS

This is a continuation of U.S. patent application Ser. No. 13/855,187, filed on 2 Apr. 2013, (issuing as U.S. Pat. No. 8,726,994 on 20 May 2014), which is a continuation of U.S. patent application Ser. No. 13/526,672, filed 19 Jun. 2012, (issued as U.S. Pat. No. 8,408,302 on 2 Apr. 2013), which was a continuation of U.S. patent application Ser. No. 13/286,676, filed 1 Nov. 2011 (now U.S. Pat. No. 8,201,627, issued on 19 Jun. 2012), which was a continuation of U.S. patent application Ser. No. 12/413,636, filed 30 Mar. 2009 (now U.S. Pat. No. 8,047,290, issued on 1 Nov. 2011), which was a continuation of U.S. patent application Ser. No. 11/975,131, filed 16 Oct. 2007 (now U.S. Pat. No. 7,510,007, issued on 31 Mar. 2009), which was a continuation of U.S. patent application Ser. No. 11/334,083, filed 17 Jan. 2006 (now U.S. Pat. No. 7,281,582, issued 16 Oct. 2007), which was a continuation-in-part of U.S. patent application Ser. No. 10/658,092, filed 9 Sep. 2003 (now U.S. Pat. No. 7,007,753, issued 7 Mar. 2006), which was non-provisional of U.S. provisional patent application Ser. No. 60/409,177, filed 9 Sep. 2002, all of which are incorporated herein by reference and to which priority is hereby claimed.

This is a continuation of U.S. patent application Ser. No. 13/855,187, filed on 2 Apr. 2013, (issuing as U.S. Pat. No. 8,726,994 on 20 May 2014), which is a continuation of U.S. patent application Ser. No. 13/526,672, filed 19 Jun. 2012, (issued as U.S. Pat. No. 8,408,302 on 2 Apr. 2013), which was a continuation of U.S. patent application Ser. No. 13/286,676, filed 1 Nov. 2011 (issuing as U.S. Pat. No. 8,201,627 on 19 Jun. 2012), which was a continuation of U.S. patent application Ser. No. 12/413,636, filed 30 Mar. 2009 (now U.S. Pat. No. 8,047,290, issued on 1 Nov. 2011), which was a continuation of U.S. patent application Ser. No. 11/975,131, filed 16 Oct. 2007 (now U.S. Pat. No. 7,510,007, issued on 31 Mar. 2009), which was a continuation of U.S. patent application Ser. No. 11/334,083, filed 17 Jan. 2006 (now U.S. Pat. No. 7,281,582, issued 16 Oct. 2007), which was non-provisional of U.S. provisional patent application Ser. No. 60/644,683, filed 19 Jan. 2005, all of which are incorporated herein by reference and to which priority is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND

In top drive rigs, the use of a top drive unit, or top drive power unit is employed to rotate drill pipe, or well string in a well bore. Top drive rigs can include spaced guide rails and a drive frame movable along the guide rails and guiding the top drive power unit. The traveling block supports the drive frame through a hook and swivel, and the driving block is used to lower or raise the drive frame along the guide rails. For rotating the drill or well string, the top drive power unit includes a motor connected by gear means with a rotatable member both of which are supported by the drive frame.

During drilling operations, when it is desired to "trip" the drill pipe or well string into or out of the well bore, the drive frame can be lowered or raised. Additionally, during servicing operations, the drill string can be moved longitudinally into or out of the well bore.

The stem of the swivel communicates with the upper end of the rotatable member of the power unit in a manner well known to those skilled in the art for supplying fluid, such as a drilling fluid or mud, through the top drive unit and into the drill or work string. The swivel allows drilling fluid to pass through and be supplied to the drill or well string connected to the lower end of the rotatable member of the top drive power unit as the drill string is rotated and/or moved up and down.

Top drive rigs also can include elevators are secured to and suspended from the frame, the elevators being employed when it is desired to lower joints of drill string into the well bore, or remove such joints from the well bore.

At various times top drive operations, beyond drilling fluid, require various substances to be pumped downhole, such as cement, chemicals, epoxy resins, or the like. In many cases it is desirable to supply such substances at the same time as the top drive unit is rotating and/or moving the drill or well string up and/or down, but bypassing the top drive's power unit so that the substances do not damage/impair the unit. Additionally, it is desirable to supply such substances without interfering with and/or intermittently stopping longitudinal and/or rotational movement by the top drive unit of the drill or well string.

A need exists for a device facilitating insertion of various substances downhole through the drill or well string, bypassing the top drive unit, while at the same time allowing the top drive unit to rotate and/or move the drill or well string.

One example includes cementing a string of well bore casing. In some casing operations it is considered good practice to rotate the string of casing when it is being cemented in the wellbore. Such rotation is believed to facilitate better cement distribution and spread inside the annular space between the casing's exterior and interior of the well bore. In such operations the top drive unit can be used to both support and continuously rotate/intermittently reciprocate the string of casing while cement is pumped down the string's interior. During this time it is desirable to by-pass the top drive unit to avoid possible damage to any of its portions or components.

The following US Patent is incorporated herein by reference: U.S. Pat. No. 4,722,389.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

BRIEF SUMMARY

The apparatus of the present invention solves the problems confronted in the art in a simple and straightforward manner. The invention herein broadly relates to an assembly having a top drive arrangement for rotating and longitudinally moving a drill or well string. In one embodiment the present invention includes a swivel apparatus, the swivel generally comprising a mandrel and a sleeve, the swivel being especially useful for top drive rigs.

The sleeve can be rotatably and sealably connected to the mandrel. The swivel can be incorporated into a drill or well string and enabling string sections both above and below the sleeve to be rotated in relation to the sleeve. Additionally, the swivel provides a flow path between the exterior of the sleeve and interior of the mandrel while the drill string is being moved in a longitudinal direction (up or down) and/or being rotated/reciprocated. The interior of the mandrel can be fluidly connected to the longitudinal bore of casing or drill string thus providing a path from the sleeve to the interior of the casing/drill string.

In one embodiment an object of the present invention is to provide a method and apparatus for servicing a well wherein a swivel is connected to and below a top drive unit for conveying pumpable substances from an external supply through the swivel for discharge into the well string, but bypassing the top drive unit.

In another embodiment of the present invention is provided a method of conducting servicing operations in a well bore, such as cementing, comprising the steps of moving a top drive unit longitudinally and/or rotationally to provide longitudinal movement and/or rotation/reciprocation in the well bore of a well string suspended from the top drive unit, rotating the drill or well string and supplying a pumpable substance to the well bore in which the drill or well string is manipulated by introducing the pumpable substance at a point below the top drive power unit and into the well string.

In other embodiments of the present invention a swivel placed below the top drive unit can be used to perform jobs such as spotting pills, squeeze work, open formation integrity work, kill jobs, fishing tool operations with high pressure pumps, sub-sea stack testing, rotation of casing during side tracking, and gravel pack or frac jobs. In still other embodiments a top drive swivel can be used in a method of pumping loss circulation material (LCM) into a well to plug/seal areas of downhole fluid loss to the formation and in high speed milling jobs using cutting tools to address down hole obstructions. In other embodiments the top drive swivel can be used with free point indicators and shot string or cord to free stuck pipe where pumpable substances are pumped downhole at the same time the downhole string/pipe/free point indicator is being rotated and/or reciprocated. In still other embodiments the top drive swivel can be used for setting hook wall packers and washing sand.

In still other embodiments the top drive swivel can be used for pumping pumpable substances downhole when repairs/servicing is being done to the top drive unit and rotation of the downhole drill string is being accomplished by the rotary table. Such use for rotation and pumping can prevent sticking/seizing of the drill string downhole. In this application safety valves, such as TIW valves, can be placed above and below the top drive swivel to enable routing of fluid flow and to ensure well control.

In an alternative embodiment the unit can include double swivel portions. In another alternative embodiment unit can include an insertion tool for inserting a plug or ball into the unit.

The drawings constitute a part of this specification and include exemplary embodiments to the invention, which may be embodied in various forms.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 4 is a sectional view of a sleeve which can be incorporated into the top drive swivel of FIG. 2;

FIG. 5 is a right hand side view of the sleeve of FIG. 4;

FIG. 6 is a sectional view of the top drive swivel of FIG. 2;

FIG. 6A is a sectional view of the packing unit shown in FIG. 6;

DETAILED DESCRIPTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

Figure 1:
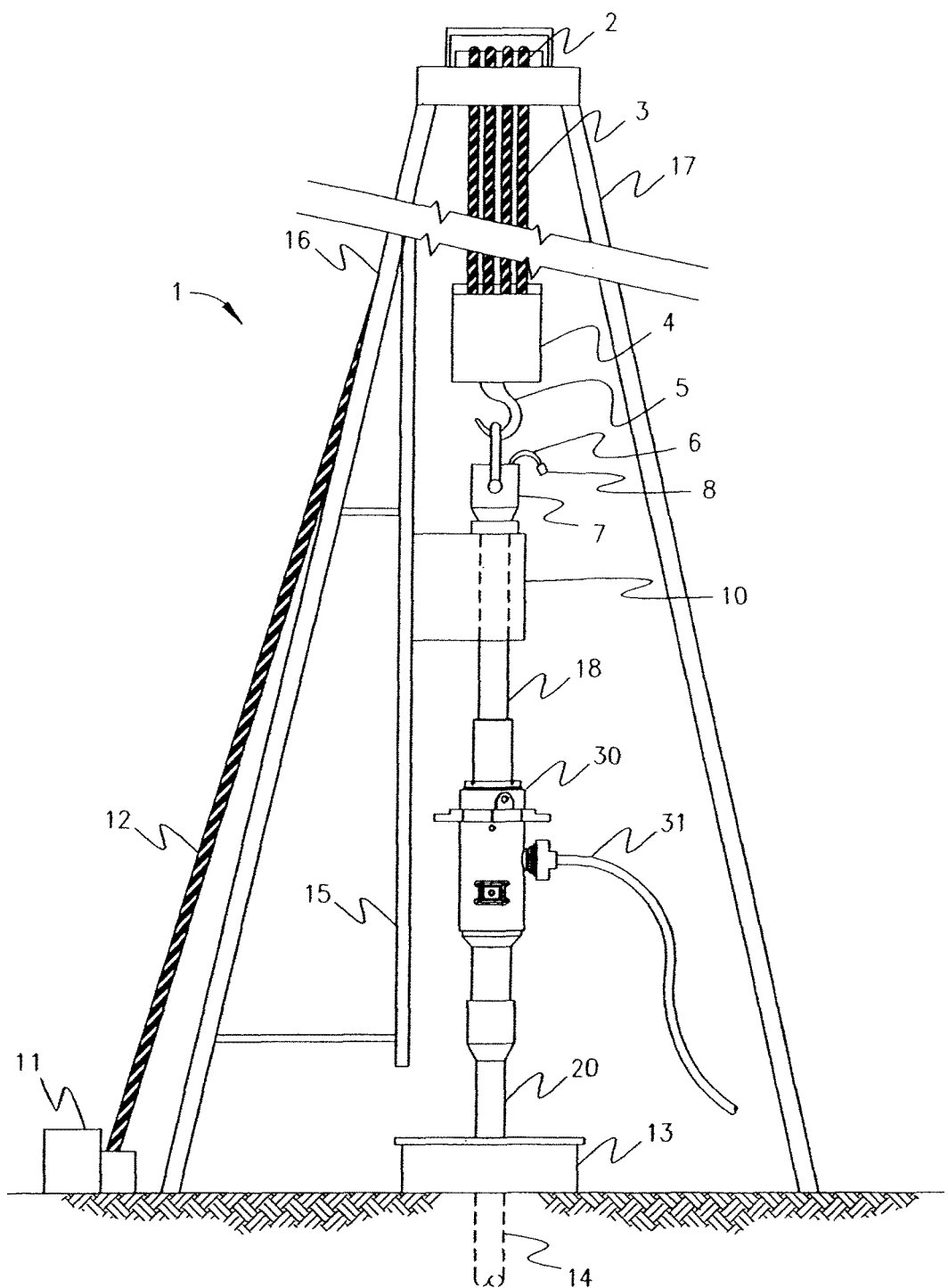
FIG. 1 is a schematic view showing a top drive rig with one embodiment of a top drive swivel incorporated in the drill string.

FIG. 1 is a schematic view showing a top drive rig 1 with one embodiment of a top drive swivel 30 incorporated into drill string 20. FIG. 1 is shows a rig 1 having a top drive unit 10. Rig 5 comprises supports 16,17; crown block 2; traveling block 4; and hook 5. Draw works 11 uses cable 12 to move up and down traveling block 4, top drive unit 10, and drill string 20. Traveling block 4 supports top drive unit 10. Top drive unit 10 supports drill string 20.

During drilling operations, top drive unit 10 can be used to rotate drill string 20 which enters wellbore 14. Top drive unit 10 can ride along guide rails 15 as unit 10 is moved up and down. Guide rails 15 prevent top drive unit 10 itself from rotating as top drive unit 10 rotates drill string 20. During drilling operations drilling fluid can be supplied downhole through drilling fluid line 8 and gooseneck 6.

At various times top drive operations, beyond drilling fluid, require substances to be pumped downhole, such as cement, chemicals, epoxy resins, or the like. In many cases it is desirable to supply such substances at the same time as top drive unit 10 is rotating and/or moving drill or well string 20 up and/or down and bypassing top drive unit 10 so that the substances do not damage/impair top drive unit 10.

Additionally, it is desirable to supply such substances without interfering with and/or intermittently stopping longitudinal and/or rotational movements of drill or well string 20 being moved/rotated by top drive unit 10. This can be accomplished by using top drive swivel 30.

Top drive swivel 30 can be installed between top drive unit 10 and drill string 20. One or more joints of drill pipe 18 can be placed between top drive unit 10 and swivel 30. Additionally, a valve can be placed between top drive swivel 30 and top drive unit 10. Pumpable substances can be pumped through hose 31, swivel 30, and into the interior of drill string 20 thereby bypassing top drive unit 10. Top drive swivel 30 is preferably sized to be connected to drill string 20 such as 4½ inch IF API drill pipe or the size of the drill pipe to which swivel 30 is connected to. However, crossover subs can also be used between top drive swivel 30 and connections to drill string 20.

Figure 2:
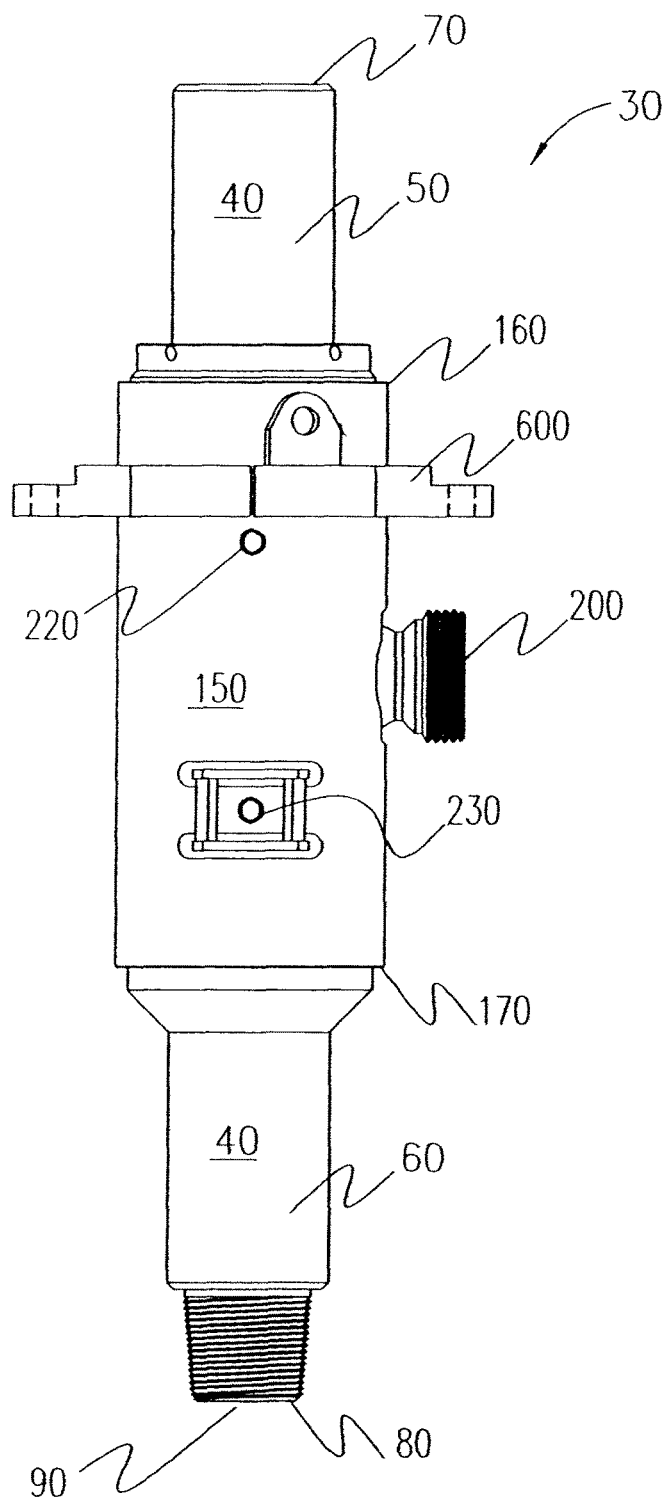
FIG. 2 is a schematic view of one embodiment of a top drive swivel.

FIG. 2 is a schematic view of one embodiment of a top drive swivel 30. Top drive swivel 30 can be comprised of mandrel 40 and sleeve 150. Sleeve 150 is rotatably and sealably connected to mandrel 40. Accordingly, when mandrel 40 is rotated, sleeve 150 can remain stationary to an observer insofar as rotation is concerned. As will be discussed later inlet 200 of sleeve 150 is and remains fluidly connected to a the central longitudinal passage 90 of mandrel 40. Accordingly, while mandrel 40 is being rotated and/or moved up and down pumpable substances can enter inlet 200 and exit central longitudinal passage 90 at lower end 60 of mandrel 40.

Figure 3:
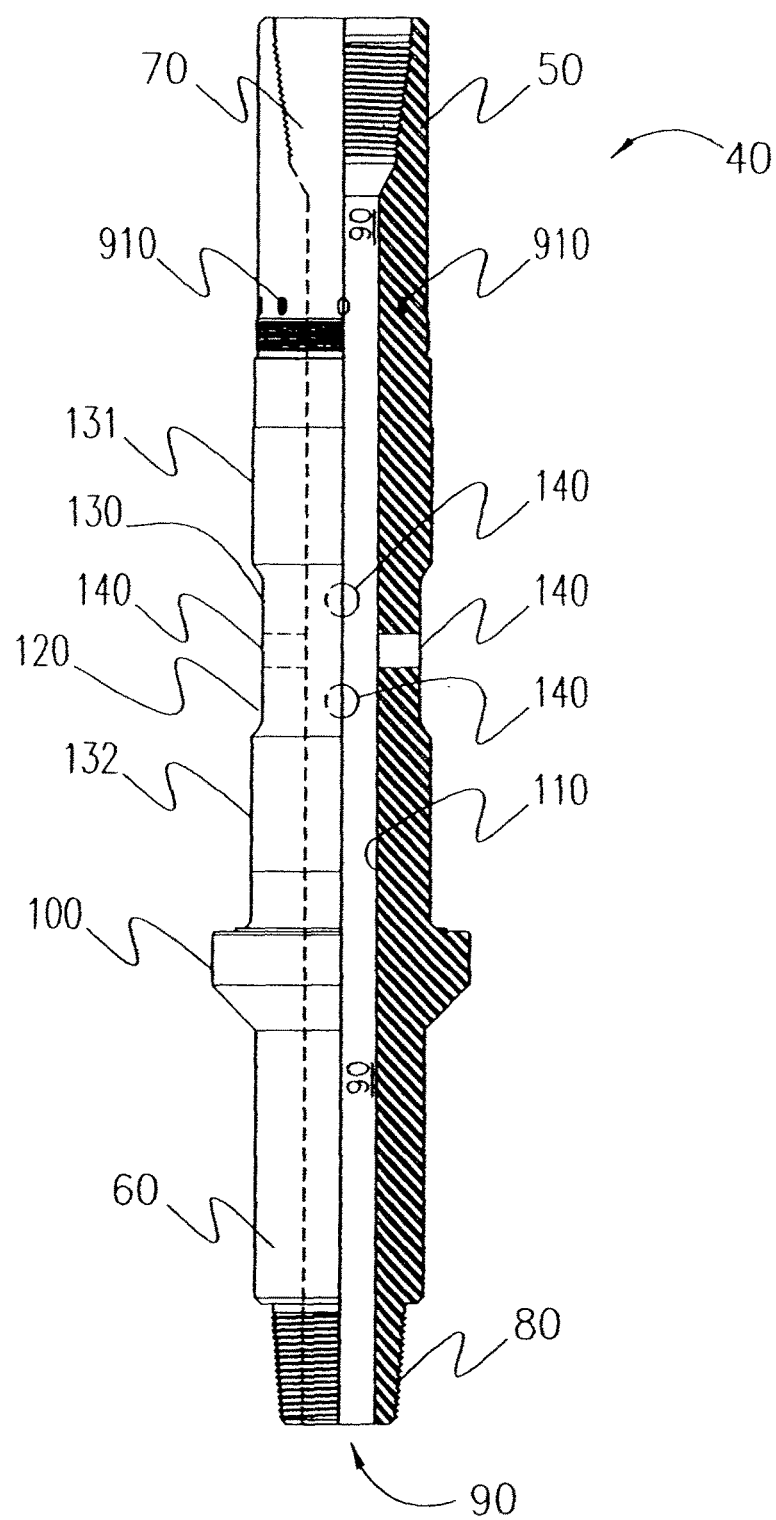
FIG. 3 is a sectional view of a mandrel which can be incorporated in the top drive swivel of FIG. 2.

FIG. 3 is a sectional view of mandrel 40 which can be incorporated in the top drive swivel 30. Mandrel 40 is comprised of upper end 50 and lower end 60. Central longitudinal passage 90 extends from upper end 50 through lower end 60. Lower end 60 can include a pin connection or any other conventional connection. Upper end 50 can include box connection 70 or any other conventional connection. Mandrel 40 can in effect become a part of drill string 20. Sleeve 150 fits over mandrel 40 and becomes rotatably and sealably connected to mandrel 40. Mandrel 40 can include shoulder 100 to supper sleeve 150. Mandrel 40 can include one or more radial inlet ports 140 fluidly connecting central longitudinal passage 90 to recessed area 130. Recessed area 130 preferably forms a circumferential recess along the perimeter of mandrel 40 and between packing support areas 131,132. In such manner recessed area will remain fluidly connected with radial passage 190 and inlet 200 of sleeve 150 (see FIGS. 4, 6).

To reduce friction between mandrel 40 and packing units 305, 415 (FIG. 6) and increase the life expectancy of packing units 305, 415, packing support areas 131, 132 can be coated and/or sprayed welded with a materials of various compositions, such as hard chrome, nickel/chrome or nickel/ aluminum (95 percent nickel and 5 percent aluminum) A material which can be used for coating by spray welding is the chrome alloy TAFA 95MX Ultrahard Wire (Armacor M) manufactured by TAFA Technologies, Inc., 146 Pembroke Road, Concord N.H. TAFA 95 MX is an alloy of the following composition: Chromium 30 percent; Boron 6 percent; Manganese 3 percent; Silicon 3 percent; and Iron balance. The TAFA 95 MX can be combined with a chrome steel. Another material which can be used for coating by spray welding is TAFA BONDARC WIRE-75B manufactured by TAFA Technologies, Inc. TAFA BONDARC WIRE-75B is an alloy containing the following elements: Nickel 94 percent; Aluminum 4.6 percent; Titanium 0.6 percent; Iron 0.4 percent; Manganese 0.3 percent; Cobalt 0.2 percent; Molybdenum 0.1 percent; Copper 0.1 percent; and Chromium 0.1 percent. Another material which can be used for coating by spray welding is the nickel chrome alloy TAFALOY NICKEL-CHROME-MOLY WIRE-71T manufactured by TAFA Technologies, Inc. TAFALOY NICKEL-CHROME-MOLY WIRE-71T is an alloy containing the following elements: Nickel 61.2 percent; Chromium 22 percent; Iron 3 percent; Molybdenum 9 percent; Tantalum 3 percent; and Cobalt 1 percent. Various combinations of the above alloys can also be used for the coating/spray welding. Packing support areas 131, 132 can also be coated by a plating method, such as electroplating. The surface of support areas 131, 132 can be ground/polished/finished to a desired finish to reduce friction and wear between support areas 131, 132 and packing units 305, 415.

FIG. 4 is a sectional view of sleeve 150 which can be incorporated into top drive swivel 30. FIG. 5 is a right hand sectional view of sleeve 150 taken along the lines 4-4. Sleeve 150 can include central longitudinal passage 180 extending from upper end 160 through lower end 170. Sleeve 150 can also include radial passage 190 and inlet 200. Inlet 200 can be attached by welding or any other conventional type method of fastening such as a threaded connection. If welded the connection is preferably heat treated to remove residual stresses created by the welding procedure. Also shown is protruding section 155 along with upper and lower shoulders 156,157. Lubrication port 210 can be included to provide lubrication for interior bearings. Packing ports 220, 230 can also be included to provide the option of injecting packing material into the packing units 305,415 (see FIG. 6). A protective cover 240 can be placed around packing port 230 to protect packing injector 235 (see FIG. 6). Optionally, a second protective cover can be placed around packing port 220, however, it is anticipated that protection will be provided by clamp 600 and inlet 200. Sleeve 150 can include peripheral groove 205 for attachment of clamp 600. Additionally, key way 206 can be provided for insertion of a key 700. FIG. 5 illustrates how central longitudinal passage 180 is fluidly connected to inlet 200 through radial passage 190. It is preferred that welding be performed using Preferred Industries Welding Procedure number T3, 1550REV-A 4140HT (285/311 bhn) RMT to 4140 HT (285/311 bhn(RMT) It is also preferred that welds be X-ray tested, magnetic particle tested, and stress relieved.

FIG. 6 is a sectional view of the assembled top drive swivel 30 of FIG. 2. As can be seen sleeve 150 slides over mandrel 40. Bearings 145, 146 rotatably connect sleeve 150 to mandrel 40. Bearings 145, 146 are preferably thrust bearings although many conventionally available bearing will adequately function, including conical and ball bearings. Packing units 305, 415 sealingly connect sleeve 150 to mandrel 40. Inlet 200 of sleeve 150 is and remains fluidly connected to central longitudinal passage 90 of mandrel 40. Accordingly, while mandrel 40 is being rotated and/or moved up and down pumpable substances can enter inlet 200 and exit central longitudinal passage 90 at lower end 60 of mandrel 40. Recessed area 130 and protruding section 155 form a peripheral recess between mandrel 40 and sleeve 150. The fluid pathway from inlet 200 to outlet at lower end 60 of central longitudinal passage 90 is as follows: entering inlet 200 (arrow 201); passing through radial passage 190 (arrow 202); passing through recessed area 130 (arrow 202); passing through one of the plurality of radial inlet ports 140 (arrow 202), passing through central longitudinal passage 90 (arrow 203); and exiting mandrel 40 via lower end 60 at pin connection 80 (arrows 204, 205).

FIG. 6A shows a blown up schematic view of packing unit 305. Packing unit 305 can comprise packing end 320;

packing ring 330, packing ring 340, packing injection ring 350, packing end 360, packing ring 370, packing ring 380, packing ring 390, packing ring 400, and packing end 410. Packing unit 305 sealing connects mandrel 40 and sleeve 150. Packing unit 305 can be encased by packing retainer nut 310 and shoulder 156 of protruding section 155. Packing retainer nut 310 can be a ring which threadably engages sleeve 150 at threaded area 316. Packing retainer nut 310 and shoulder 156 squeeze packing unit 305 to obtain a good seal between mandrel 40 and sleeve 150. Set screw 315 can be used to lock packing retainer nut 310 in place and prevent retainer nut 310 from loosening during operation. Set screw 315 can be threaded into bore 314 and lock into receiving area 317 on sleeve 150. Packing unit 415 can be constructed substantially similar to packing unit 305. The materials for packing unit 305 and packing unit 415 can be similar.

Packing end 320 is preferably a bronze female packing end. Packing ring 330 is preferably a "Vee" packing ring—Teflon such as that supplied by CDI part number 0500700-VS-720 Carbon Reflon (having 2 percent carbon). Packing ring 340 is preferably a "Vee" packing ring—Rubber such as that supplied by CDI part number 0500700-VS-850NBR Aramid. Packing injection ring 350 is described below in the discussion regarding FIGS. 6B and 6C. Packing end 360 preferably a bronze female packing end. Packing ring 370 is preferably a "Vee" packing ring—Teflon such as that supplied by CDI part number 0500700-VS-720 Carbon Reflon (having 2 percent carbon). Packing ring 380 is preferably a "Vee" packing ring—Rubber such as that supplied by CDI part number 0500700-VS-850NBR Aramid. Packing ring 390 is preferably a "Vee" packing ring—Teflon such as that supplied by CDI part number 0500700-VS-720 Carbon Reflon (having 2 percent carbon). Packing ring 400 is preferably a "Vee" packing ring—Rubber such as that supplied by CDI part number 0500700-VS-850NBR Aramid. Packing end 410 is preferably a bronze male packing ring. Various alternative materials for packing rings can be used such as standard chevron packing rings of standard packing materials. Bronze rings preferably meet or exceed an SAE 660 standard.

Figure 9:
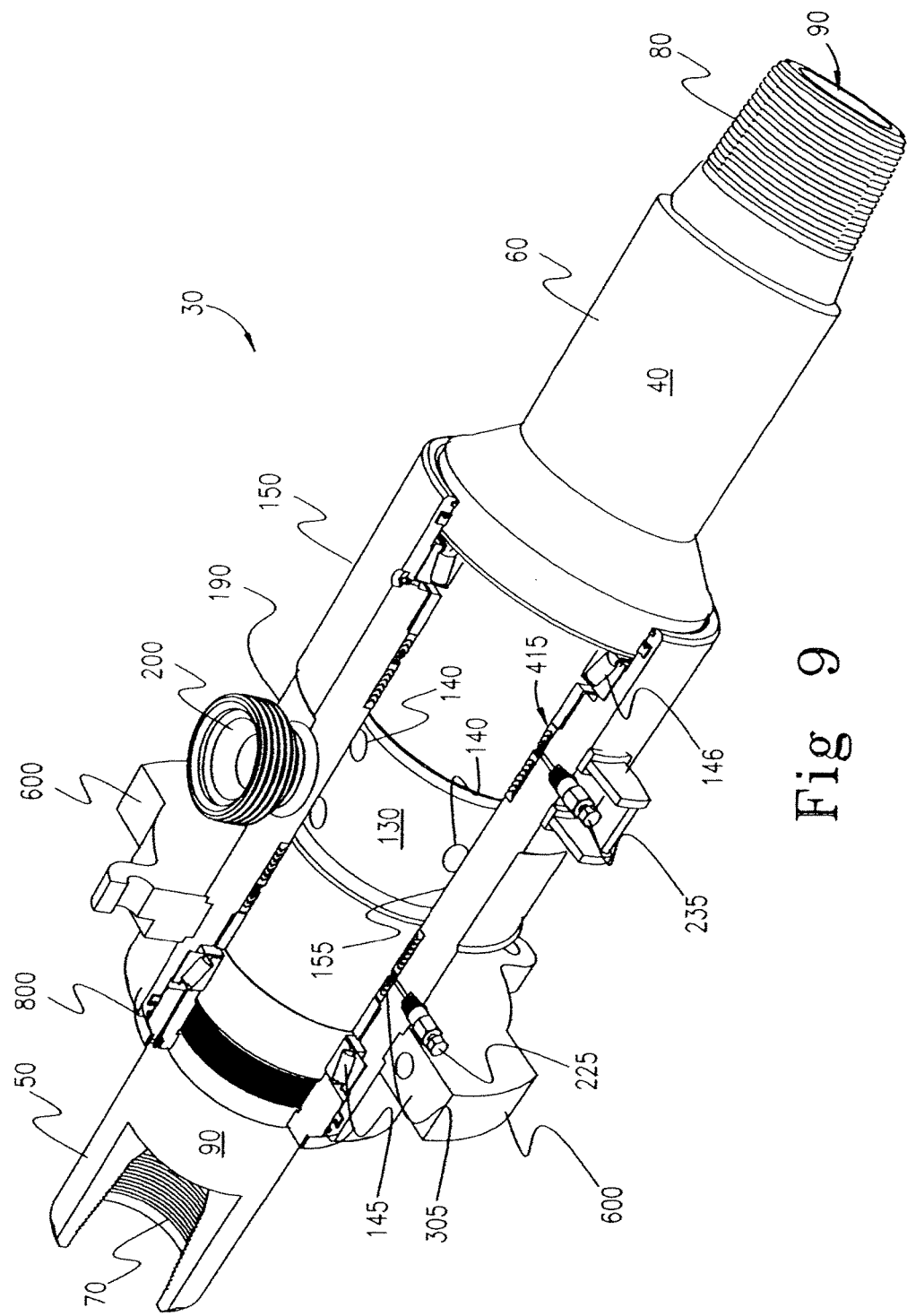
FIG. 9 is a perspective view and partial sectional view of the top drive swivel shown in FIG. 2.

A packing injection option can be provided for top drive swivel 30. Injection fitting 225 can be used to inject additional packing material such as teflon into packing unit 305. Head 226 for injection fitting 225 can be removed and packing material can then be inserting into fitting 225. Head 226 can then be screwed back into injection fitting 225 which would push packing material through fitting 225 and into packing port 220. The material would then be pushed into packing ring 350. Packing ring 350 can comprise radial port 352 and transverse port 351. The material would proceed through radial port 352 and exit through transverse port 351. The material would tend to push out and squeeze packing rings 340, 330, 320 and packing rings 360, 370, 380, 390, 400 tending to create a better seal between packing unit 305 with mandrel 40 and sleeve 150. The interaction between injection fitting 235 and packing unit 415 can be substantially similar to the interaction between injection fitting 225 and packing unit 305. A conventionally available material which can be used for packing injection fittings 225, 235 is DESCO™ 625 Pak part number 6242-12 in the form of a 1 inch by ⅜ inch stick and distributed by Chemola Division of South Coast Products, Inc., Houston, Tex. In FIG. 6, injection fitting 235 is shown ninety degrees out of phase and, is preferably located as shown in FIG. 9.

Injection fittings 225, 235 have a dual purpose: (a) provide an operator a visual indication whether there has been any leakage past either packing units 305, 415 and (b) allow the operator to easily inject additional packing material and stop seal leakage without removing top drive swivel 30 from drill string 20.

Figure 6C:
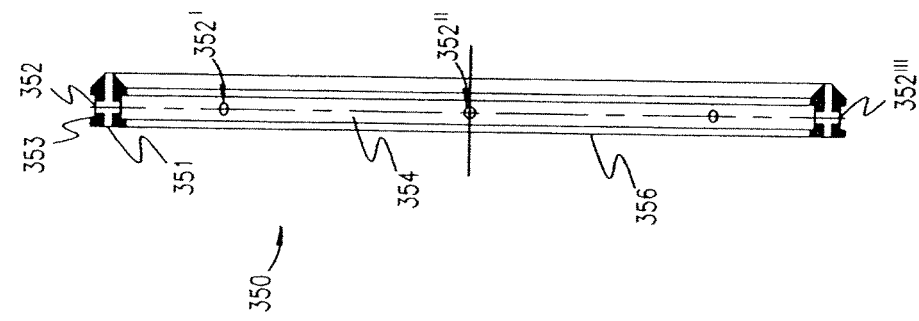
FIG. 6C is a side view section of the packing injection ring shown in FIG. 6B.
Figure 6B:
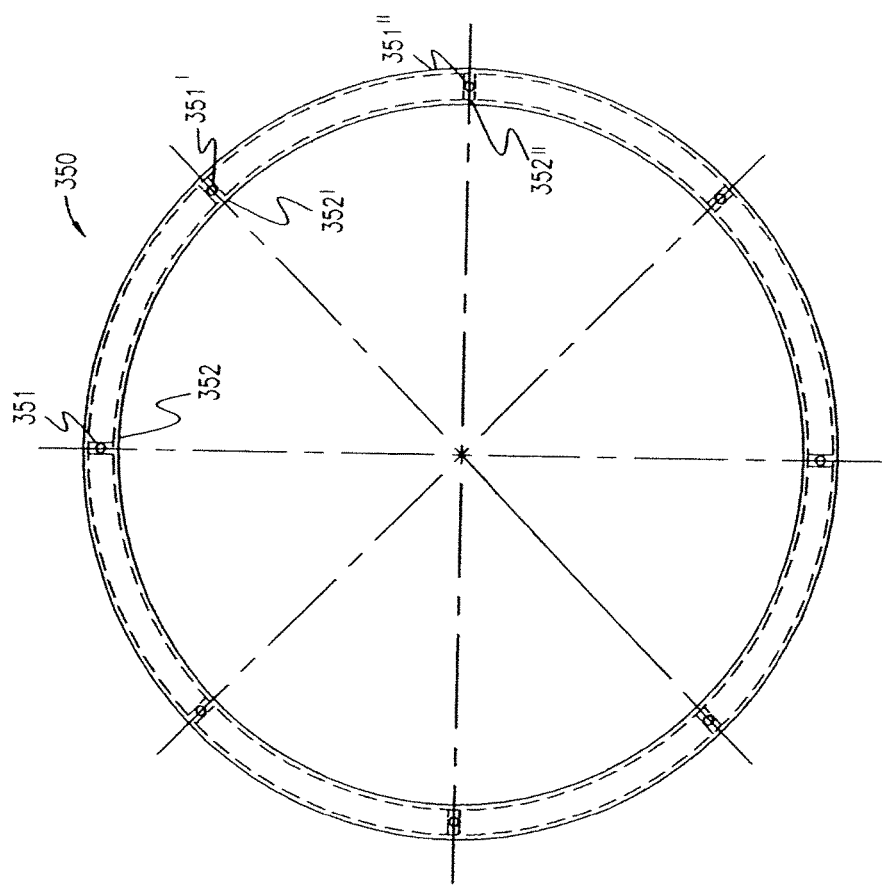
FIG. 6B is a top view of the packing injection ring shown in FIGS. 6 and 6A.

FIGS. 6B and 6C shows top and side views of packing injection ring 350. Packing injection ring 350 includes a male end 355 at its top and a flat end 356 at its rear. Ring 350 includes peripheral groove 353 around its perimeter. Optionally, ring 350 can include interior groove along its interior. A plurality of transverse ports 351, 351', 351", 351"', etc. extending from male end 355 to flat end 356 can be included and can be evenly spaced along the circumference of ring 350. A plurality of radial ports 352, 352', 352", 352"', etc. can be included extending from peripheral groove 353 and respectively intersecting transverse ports 351, 351', 351", 351"', etc. Preferably, the radial ports can extend from peripheral groove 353 through interior groove 354.

Retainer nut 800 can be used to maintain sleeve 150 on mandrel 40. Retainer nut 800 can threadably engage mandrel 40 at threaded area 801. Set screw 890 can be used to lock in place retainer nut 800 and prevent nut 800 from loosening during operation. Set screw 890 threadably engages retainer nut 800 through bore 900 and sets in one of a plurality of receiving portions 910 formed in mandrel 40. Retaining nut 800 can also include grease injection fitting 880 for lubricating bearing 145. Wiper ring 271 set in area 270 protects against dirt and other items from entering between the sleeve 150 and mandrel 40. Grease ring 291 set in area 290 holds in lubricant for bearing 145.

Bearing 146 can be lubricated through grease injection fitting 211 and lubrication port 210. Bearing 145 can be lubricated through grease injection fitting 881 and lubrication port 880.

Figure 8:
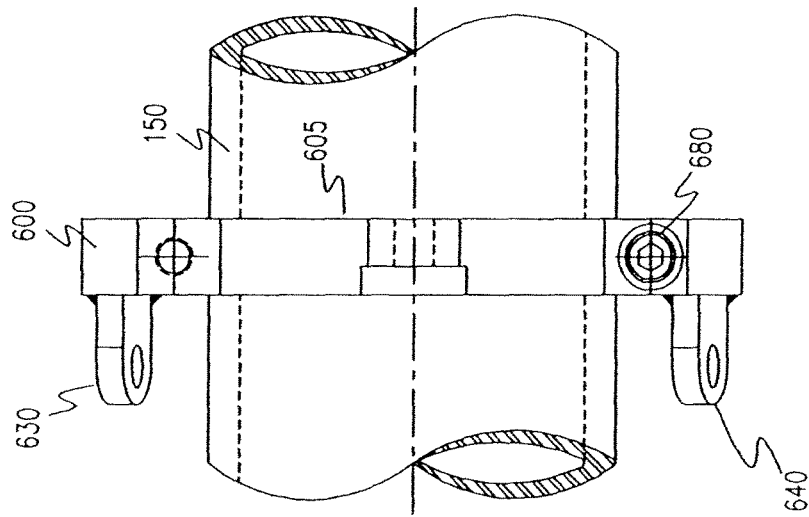
FIG. 8 is a side view of the clamp of FIG. 7.
Figure 7:
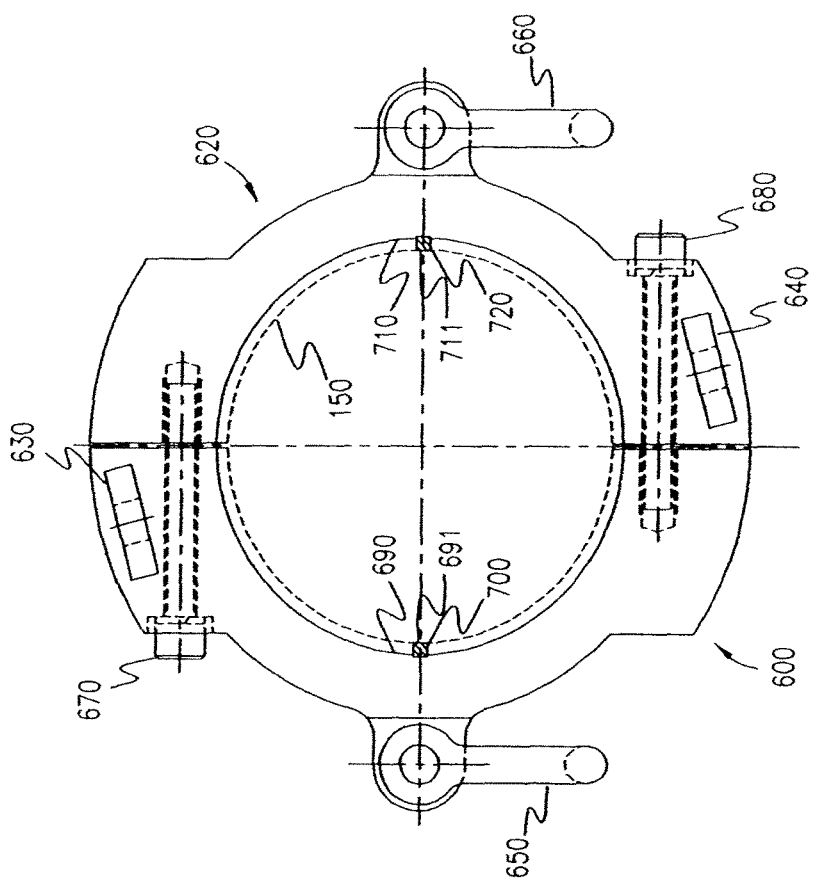
FIG. 7 is a top view of a clamp which can be incorporated into the top drive swivel of FIG. 2.

FIG. 7 is a top view of clamp 600 which can be incorporated into top drive swivel 30. FIG. 8 is a side view of clamp 600. Clamp 600 comprises first portion 610 and second portion 620. First and second portions 610, 620 can be removably attached by fasteners 670, 680. Clamp 600 fits in groove 205/605 of sleeve 150 (FIG. 6). Key 700 can be included in keyway 690. A corresponding keyway 691 is included in sleeve 150 of top drive swivel 30. Keyways 690, 691 and key 700 prevent clamp 600 from rotating relative to sleeve 150. A second key 720 can be installed in keyways 710, 711. Shackles 650, 660 can be attached to clamp 600 to facilitate handing top drive swivel 30 when clamp 600 is attached. Torque arms 630, 640 can be included to allow attachment of clamp 600 (and sleeve 150) to a stationary part of top drive rig 1 and prevent sleeve 150 from rotating while drill string 20 is being rotated by top drive 10 (and top drive swivel 30 is installed in drill string 20). Torque arms 630, 640 are provided with holes for attaching restraining shackles. Restrained torque arms 630, 640 prevent sleeve 150 from rotating while mandrel 40 is being spun. Otherwise, frictional forces between packing units 305, 415 and packing support areas 131, 135 of rotating mandrel 40 would tend to also rotate sleeve 150. Clamp 600 is preferably fabricated from 4140 heat treated steel being machined to fit around sleeve 150.

FIG. 9 is an overall perspective view (and partial sectional view) of top drive swivel 30. Sleeve 150 is shown rotatably connected to mandrel 40. Bearings 145, 146 allow sleeve 150 to rotate in relation to mandrel 40. Packing units 305, 415 sealingly connect sleeve 150 to mandrel 40. Retaining nut 800 retains sleeve 150 on mandrel 40. Inlet 200 of sleeve 150 is fluidly connected to central longitudinal passage 90 of mandrel 40. Accordingly, while mandrel 40 is being rotated and/or moved up and down pumpable substances can enter inlet 200 and exit central longitudinal passage 90 at lower end 60 of mandrel 40. Recessed area 130 and protruding section 155 form a peripheral recess between mandrel 40 and sleeve 150. The fluid pathway from inlet 200 to outlet at lower end 60 of central longitudinal passage 90 is as follows: entering inlet 200; passing through radial passage 190; passing through recessed area 130; passing through one of the plurality of radial inlet ports 40; passing through central longitudinal passage 90; and exiting mandrel 40 through central longitudinal passage 90 at lower end 60 and pin connection 80. In FIG. 9, injection fitting 225 is shown ninety degrees out of phase and, for protection, is preferably located between inlet 200 and clamp 600.

Mandrel 40 takes substantially all of the structural load from drill string 20. The overall length of mandrel 40 is preferably 52 and ⁵⁄₁₆ inches. Mandrel 40 can be machined from a single continuous piece of heat treated steel bar stock. NC50 is preferably the API Tool Joint Designation for the box connection 70 and pin connection 80. Such tool joint designation is equivalent to and interchangeable with 4½ inch IF (Internally Flush), 5 inch XH (Extra Hole) and 5½ inch DSL (Double Stream Line) connections. Additionally, it is preferred that the box connection 70 and pin connection 80 meet the requirements of API specifications 7 and 7G for new rotary shouldered tool joint connections having 6⅝ inch outer diameter and a 2¾ inch inner diameter. The Strength and Design Formulas of API 7G—Appendix A provides the following load carrying specification for mandrel 40 of top drive swivel 30: (a) 1,477 k pounds tensile load at the minimum yield stress; (b) 62,000 foot-pounds torsion load at the minimum torsional yield stress; and (c) 37,200 foot-pounds recommended minimum make up torque. Mandrel 40 can be machined from 4340 heat treated bar stock.

Sleeve 150 is preferably fabricated from 4140 heat treated round mechanical tubing having the following properties: (120,000 psi minimum tensile strength, 100,000 psi minimum yield strength, and 285/311 Brinell Hardness Range). The external diameter of sleeve 150 is preferably about 11 inches. Sleeve 150 preferably resists high internal pressures of fluid passing through inlet 200. Preferably top drive swivel 30 with sleeve 150 will withstand a hydrostatic pressure test of 12,500 psi. At this pressure the stress induced in sleeve 150 is preferably only about 24.8 percent of its material's yield strength. At a preferable working pressure of 7,500 psi, there is preferably a 6.7:1 structural safety factor for sleeve 150.

To minimize flow restrictions through top drive swivel 30, large open areas are preferred. Preferably each area of interest throughout top drive swivel 30 is larger than the inlet service port area 200. Inlet 200 is preferably 3 inches having a flow area of 4.19 square inches. The flow area of the annular space between sleeve 150 and mandrel 40 is preferably 20.81 square inches. The flow area through the plurality of radial inlet ports 140 is preferably 7.36 square inches. The flow area through central longitudinal bore 90 is preferably 5.94 square inches.

Figure 10:
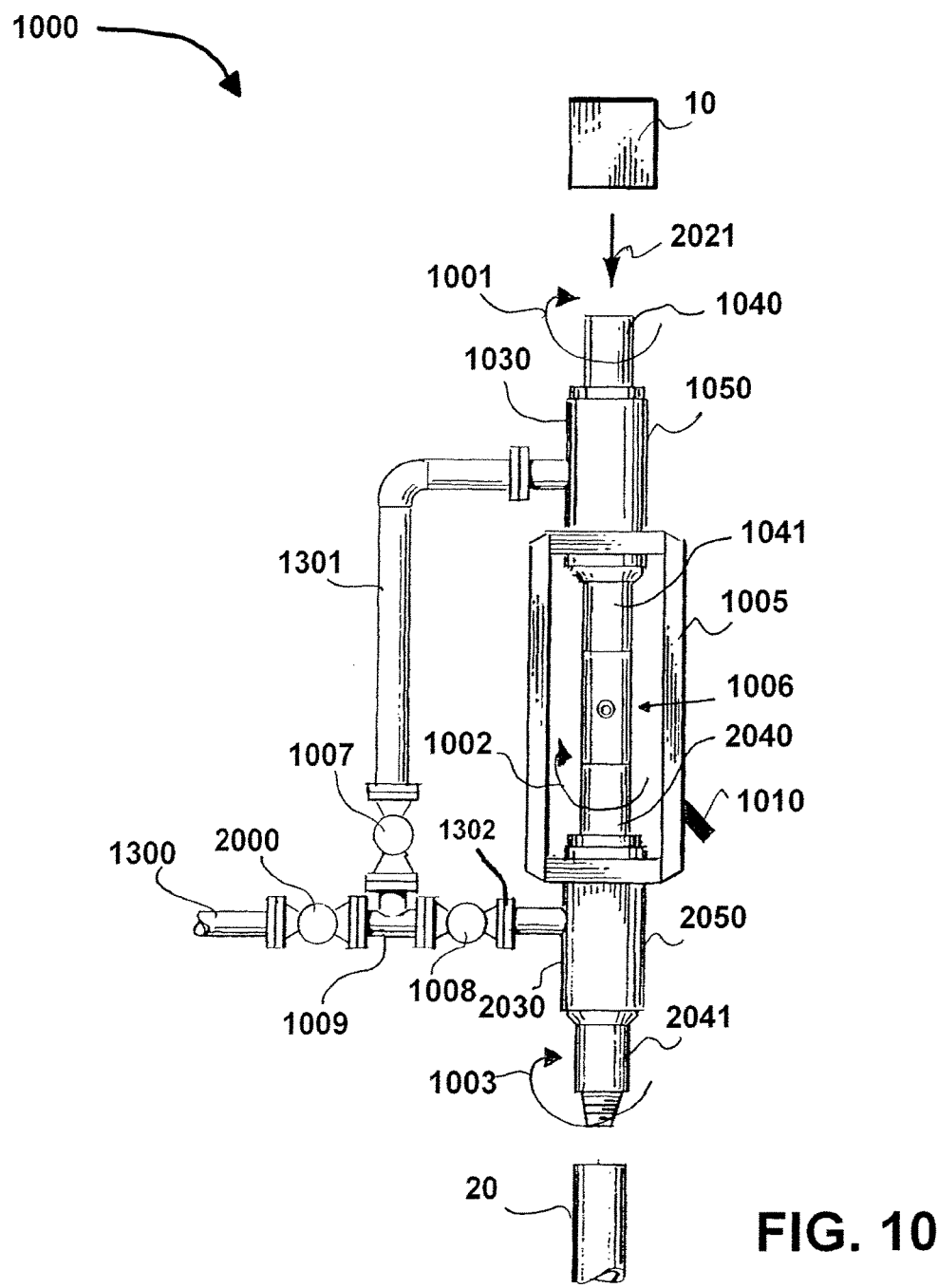
FIG. 10 is a schematic view of an alternative embodiment of a top drive swivel having double swivel portions.

FIG. 10 is a schematic view of an alternative embodiment of a top drive swivel 1000 having double swivel portions 1030, 2030 and intermediate valve 1006. Each swivel portion 1030,2030 can be constructed similar to top drive swivel 30. Similar to top drive swivel 30 shown in FIG. 1, top drive swivel 1000 can be connected to top drive unit 10 and drill string 20. Valve 1006 can be a full opening ball valve. One or more additional valves can be included between swivel portions 1030,2030.

Stabilizing bracket 1005 can be used to stabilize swivels 1030 and 2030 (and sleeves 1050 and 2050). Stabilizing bracket can include arm 1010 which can be connected rigidly, slidingly, or otherwise to rig 1 (shown in FIG. 1) or some other fixed member for constraining or restricting movement of sleeves 1050 and 2050. A sliding connection of arm 1010 allows top drive unit 1 to move drill string 20 up and down at the same time top drive unit 1 rotates drill string 20. A rigid connection would restrict up and down movement (but not rotation) of drill string 20. Connecting stabilizing bracket 1010 to rig 1 is preferred to address the tendency of frictional forces (occurring between mandrels 1040 and 2040 and sleeves 1050 and 2050) causing sleeves 1050 and 2050 to rotate when mandrels 1040 and 2040 rotate.

Rotation of top drive unit 1 can cause rotation of swivel mandrel 1040 as shown by arrow 1001. Rotation of swivel mandrel 1040 in the direction of arrow 1001 causes rotation of valve member 1006 as shown by arrow 1002. Rotation of valve member 1006 in the direction of arrow 1002 causes rotation of swivel mandrel 2040 as shown by arrow 1003. Rotation of swivel mandrel 2040 in the direction 1003 causes rotation of drill string 20. Rotation of top drive unit in the opposite direction as that described above will cause rotation of mandrel 1040, valve member 1006, and mandrel in the opposite direction of arrows 1001, 1002, and 1003.

Line 1300 can be used for fluids or other items which are to be pumped into either or both of swivels 1030, 2030. Line 1300 can comprise manifold 1009, lines 1301,1302 along with valve members 1007 and 1008. Valve members 1007 and 1008 can be any conventionally available valves such as ball or gate valves and can be manually or automatically operated. Valve member 1007 can control flow to/from swivel 1030. Valve member 1008 can control flow to/from swivel 2030. Valve member 1006 can control flow between mandrel 1040 and mandrel 2040. Control valve 2000 can be included in line 1300 to control flow to/from line 1300.

With valve 1006 closed (and valves 1007,1008 open) fluids can be pumped from top drive unit 10, into swivel 2050, into line 1301, through open valve 1007, through manifold 1009, through open valve 1008, into mandrel 2040, through lower portion of mandrel 2041, and into drill string 20. Control valve 2000 is typically closed for this flow circuit. This flow circuit allows valve 1006 to be circumvented when valve 1006 is closed. During this time period mandrels 1040,2040 can be rotated by top drive 10 while sleeves 1050,2050 remain stationary.

A double swivel construction provides the flexibility of allowing an operator to divert the flow of fluids from line 1300 to swivel 1030 or to swivel 2030 (or to both swivel 1030 and swivel 2030) while drill string 20 is worked without having to break down drill string 20 or stop operations of top drive unit 10. For example during cementing operations top drive swivel 1000 can be used to pump cement into drill string 20 which can then be used to cement casing in well bore 14. With valve 1006 open (and valve 1008 closed) cement can be pumped from line 1300, through open valve 2000, through open valve 1007, into line 1301, into and into swivel 1050 and mandrel 1040, through lower portion of mandrel 1041, through open valve 1006, into mandrel 2040, through lower portion of mandrel 2040, and into drill string 20. If a plug or ball 2005 (shown in FIG. 11) had been placed above valve 1006, then the pumped cement would be separated from downstream fluid by plug or ball 2005. With valve 1008 open (and valve 1006 closed), cement can be pumped from line 1300 through open valve 2000, through open valve 1008, and into swivel 2050 and mandrel 2040, through lower portion of mandrel 2041, and into drill string 20. With valves 1006, 1007, and 1008, cement can be pumped from line 1300 through open valve 2000 and into both swivels 1030, 2030.

Figure 11:
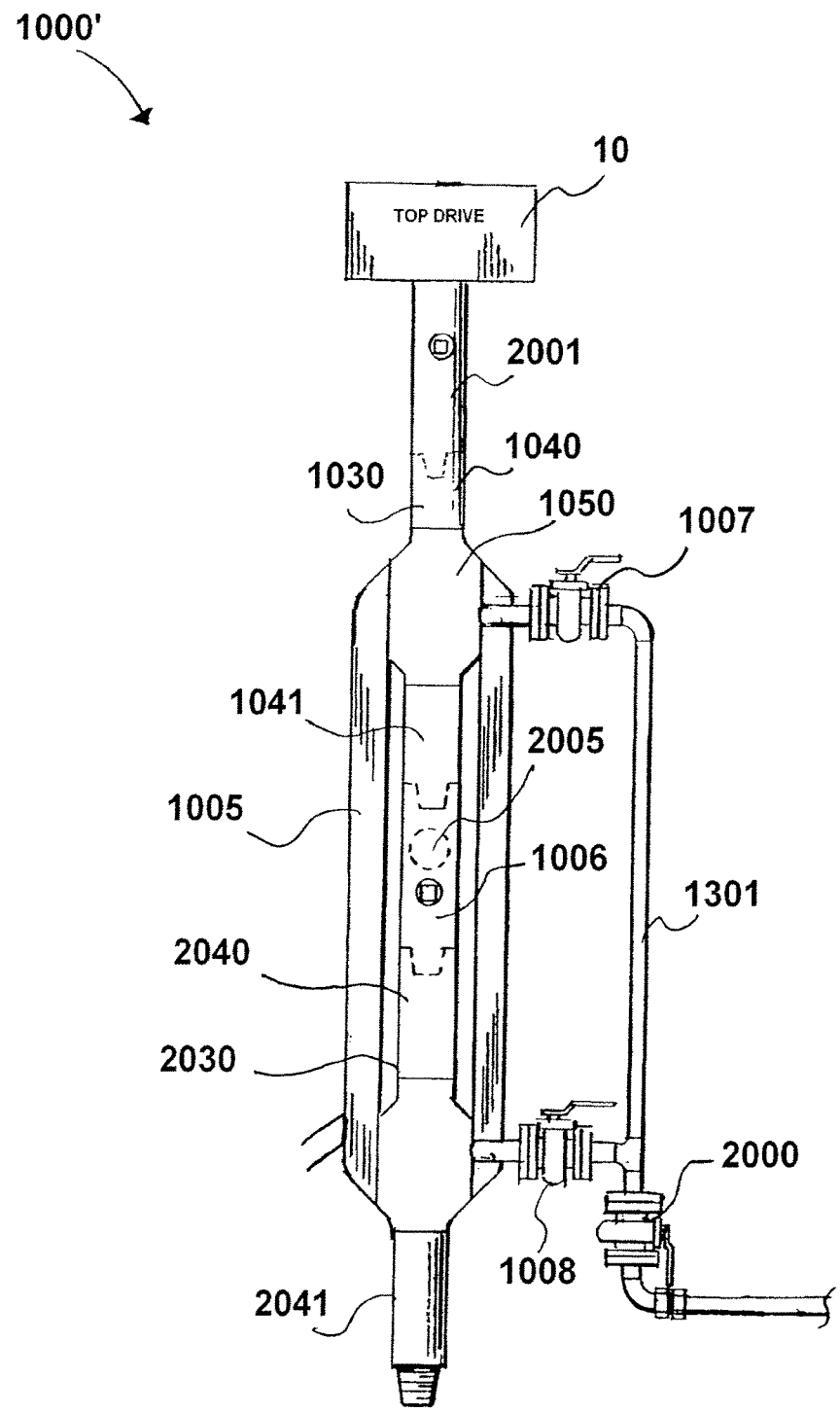
FIG. 11 is a schematic view of an alternative embodiment of a top drive swivel having double swivel portions.

FIG. 11 is a schematic view of an alternative embodiment of a top drive swivel 1000' having double swivel portions. In this embodiment, a valve 2001 is placed between top drive unit 10 and swivel 1000'. Valves 1007,1008 are placed immediately adjacent swivels 1030,2030. Valve 2001 will prevent any fluid being pumped into swivels 1030,2030 from entering top drive unit 10. Valve 2001 will also prevent any fluid from top drive unit 10 from entering top drive swivel 1000'. Shown in FIG. 11 is plug or ball 2005 which can be used to clean the inside of drill string 20 or to separate two sets of fluids being pumped into drill string 20 (e.g., drilling/completion fluid versus cement). Preferably plug or ball 2005 is a 5½ inch rubber ball for 4½ inch IF drill string 20. Different sized balls can be used for different size drill or work strings 20. Additionally conventionally available plugs can also be used.

In another alternative embodiment, valve 2001 can be placed above valve 1006 and between swivels 1050,2050. Plug or ball 2005 can be placed between valves 2001,1006. In this embodiment valves 2001,1006 hold plug or ball 2005 until it is to be dropped into drill string 20. Plug or ball 2005 is dropped by opening valves 2001,1006. Fluid being pumped through mandrel 1040 will force plug or ball 2005 to drop into drill string 20.

Figure 12:
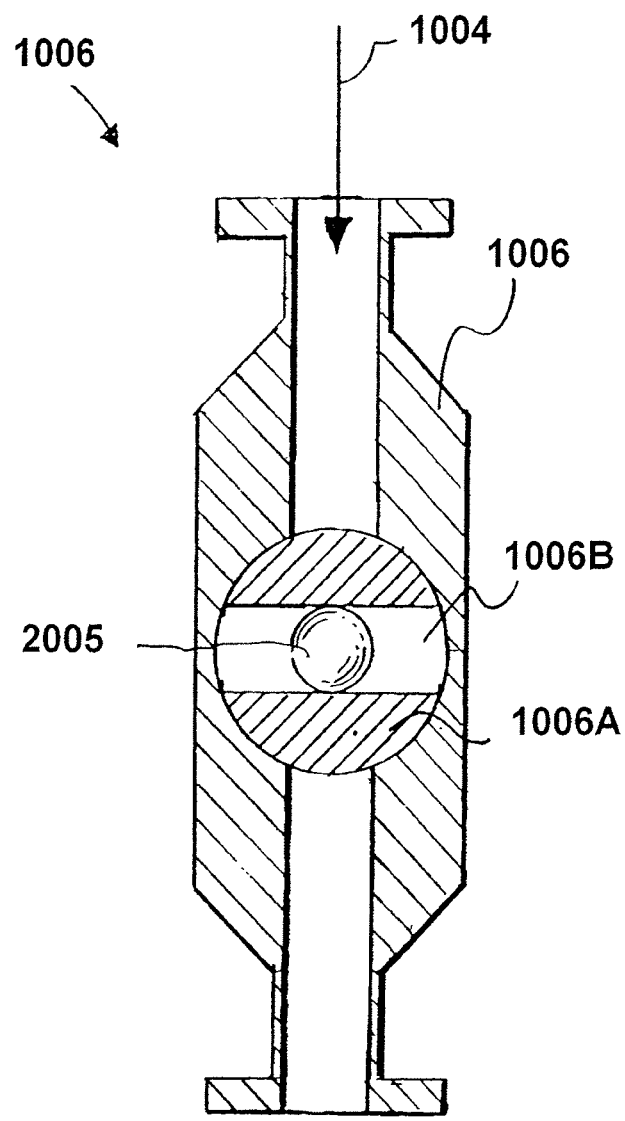
FIG. 12 is a schematic view of an alternative valve wherein the valve ball holds a plug or ball.

FIG. 12 shows another embodiment where valve 1006 is a ball valve and plug or ball 2005 is inserted into the through bore 1006B of valve ball 1006A of valve 1006. Valve 1006 is constructed such that through bore 1006B can accommodate plug or ball 2005 when valve 1006A is completely in the closed position. In the closed position valve ball 1006A will trap plug or ball 2005, but in the open position fluid pressure (schematically illustrated by arrow 1004) will force plug or ball 2005 out of valve 1006 and into drill string 20.

Figure 13:
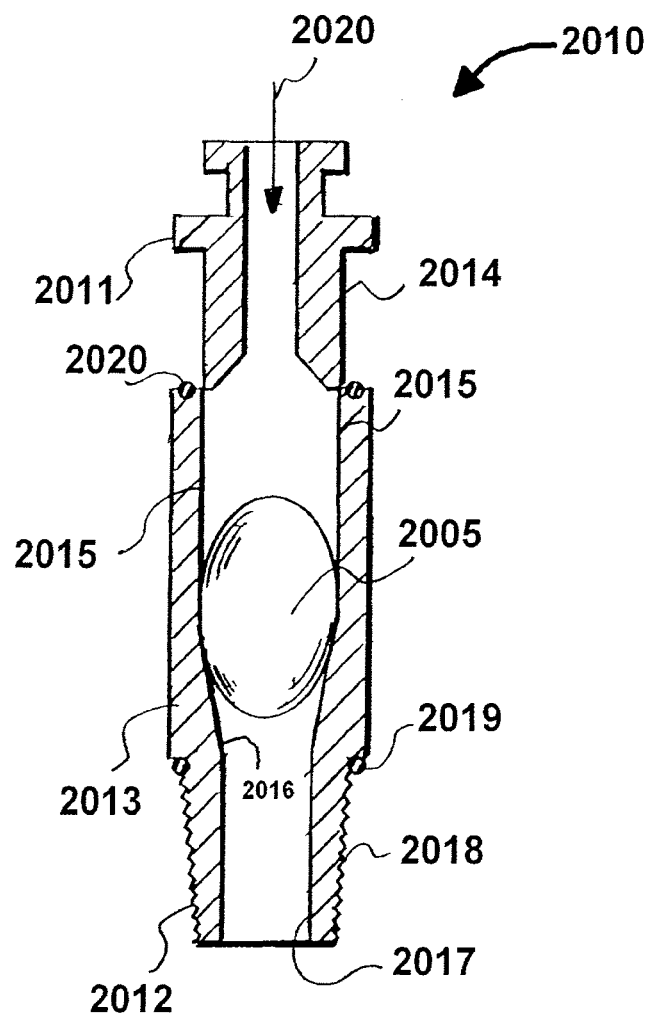
FIG. 13 shows a tool for inserting a ball into the top drive swivel or drill string.

FIG. 13 shows a tool 2010 for inserting plug or ball 2005 into position in top drive swivel 1000 or valve 1006. Tool 2010 can comprise three sections: upper section 2011, middle section 2013, and lower section 2012. Upper section 2011 can include a connection for pumping fluid. Upper section 2011 can be removably connected to middle section 2013 by a threaded section 2014. Middle section 2013 can include an enlarged inner diameter section 2015 and a narrowing diameter section 2016. Middle section 2013 can also include an o-ring seal 2014. Lower section 2012 can include threaded section 2018 and an o-ring seal 2019.

To insert plug or ball into valve 1006 of top drive swivel 1000 shown in FIG. 10, lower section 2012 can be threaded into the upper portion of mandrel 1040. Valve 1006 should be partially closed to prevent plug or ball 2005 from passing. Plug or ball 2005 is inserted into enlarged inner diameter section 2015 of tool 2010. Upper section 2011 is threaded into enlarged diameter section. A pipe or hose is connected to upper section 2011 and pressurized fluid is pumped through upper section 2011 in the direction of arrow 2020. The pressurized fluid will force plug or ball 2005 through narrowing section 2016 and out through lower section 2012 and into mandrel 1040. Plug or ball 2005 will continue downward until stopped by valve 1006. At this point fluid pressure is cut off and tool 2010 is removed. Valve 1006 is complete closed and top drive swivel 1000 is installed in drill string 20. When plug or ball 2005 is to be dropped into drill string 20, valve 1006 is opened and fluid is pumped through mandrel 1040 in the in the direction of arrow 2021.

The following will illustrate various methods for using swivels 30,1000.

Swivel Tool 30 and Swiveling Ball Drop Assembly 1000

There are many advantages that will lead to successful operations and a reduction in rig time when utilizing Swivel Tool 30 and Swiveling Ball Drop Manifold Assemblies 1000.

Cement Plugs set in open hole or in casing can be better distributed along the cement column, especially in directionally drilled wells, as pipe 18,20 rotation can be applied while pumping the plugs in place. Swivel Tool 30 will perform efficiently, either in setting a Balanced Plug or using a Plug Catcher.

When displacing a hole 14 to a reduced mud weight where a high differential pressure may be encountered, the bit can be run to Total Depth and hole 14 displaced in a single step procedure, saving time as to staging in the hole 14. The pipe 20 can be rotated while the hole 14 is being displaced, which will lead to less contamination of the interface between fluids being displaced and less debris remaining in the hole 14.

When the Well 14 is perforated underbalance with a Tubing Conveyed Perforate assembly, the Manifold 1000 assembly can be utilized. A Wireline can be rigged up above the Manifold 1000 and a Correlation Log run, the Tubing Conveyed Perforate moved to be put on depth, lines rigged up and tested, Tubing Conveyed Perforate Packer set, By-Pass 1007 opened, the desired underbalance pumped, By-Pass 1007 closed and the Tubing Conveyed Perforate fired and flow back achieved, By-Pass 1007 opened and the influx reversed out. If the primary detonation of the Tubing Conveyed Perforate is a bar drop, the Full Opening Ball Valve 1006 would be ideal for this purpose.

The Swivel Manifold 1000, with the 4½" IF connections can easily be spaced out with in a stand of drill pipe and stored on the derrick before and after the operation of choice has been performed and easily applied to the Top Drive system 10.

The outside torque applied to the Swivel Tool assemblies 1050, 2050 is a minimum torque value when the pipe 18,20 is rotated, however, a Stiff-Arm 1010 assembly can be easily attached and utilized.

The Swiveling Ball Drop Manifold 1000 can be equipped with 3 inch Low Torque Valves 1007,1008 leading to less restriction when pumping fluid through at higher volumes, if desired.

Open Hole Cement Plug Swivel Tool 30 Only (1) Pick up Ported Mule Shoe Sub that has been orange peeled in with a round tapered bottom with one-half inch circular port at the bottom of sub with added one-half inch circular ports staggered on side of sub. The round tapered bottom will help keep the Mule Shoe Sub from setting down in a possible ledge or other downhole obstruction.

(2) Pick up enough Cement Stingers to cover the height of intended cement plug and 100 feet. Scratchers and Centralizers are optional.

(3) Trip in hole 14 to casing shoe.

(4) In a strand of Drill Pipe, pick up the Swivel Tool 30 (with a TIW Valve in the open position on top of the Swivel Tool and a Low Torque Valve in the closed position connected to the side-entry port 200 of the Swivel Tool 30 which is called the pump in sub) and set back on derrick 1. Rig up Cement Lines on rig 1 floor to be ready for connection to Swivel Tool 30, once in the hole 14 to cement depth.

(5) Continue in hole 14 to cement depth.

(6) Rig up cement lines to Swivel Tool 30.

(7) Circulate and condition mud. Rotate the Drill Pipe 18,20 while circulating.

(8) Off-Line operations can be performed while circulating. Cementer can prepare the Spacers and Cement Mix water. The Pre-Job Task Meeting can also be conducted and cement lines tested.

(9) After the desired circulation time has passed, keep Drill Pipe 18,20 rotating, close the TIW Valve above the Swivel Tool 30, pressure up on top of the TIW to +−1000 pounds per square inch with the Top Drive 10 and open the Low Torque Valve to inlet 200.

(10) Pump Spacer, Cement, Spacer and displace as per Cement Program with pipe 18,20 rotating at all times.

(11) After cement has been spotted, rig down cement line and store Swivel Tool 30 on derrick 1.

(12) Pull Drill Pipe 20 out of hole above top of cement. Pump Wiper Ball 2005 to Clean the Drill Pipe 20 if desired.

(13) Pull out of hole 14.

Cement Plug Swivel Tool 1000/Ball Launch Manifold Plug Catcher (1) Pick up Ported Mule Shoe Sub that has been orange peeled in with a round tapered bottom with one-half inch circular port at the bottom of sub with added one-half inch circular ports staggered on side of sub. The round tapered bottom will help keep the Mule Shoe Sub from setting down in a possible ledge.

(2) Pick up enough Cement Stingers to cover the height of intended cement plug and 100 feet. Scratchers and Centralizers are optional.

(3) Pick up Plug Catcher.

(4) Place Cement Stringers in hole to casing shoe.

(5) In a stand of Drill Pipe, pick up the Swivel Tool and Ball Launch Manifold Assembly 1000 with the Full Opening Ball Valve 1006 in the closed position with proper Wiper Ball or Dart 2005 loaded above the closed Ball Valve 1006. Place the Low Torque Valve 1008 on the Lower Swivel Pump-in Sub 2030 in open position. Place the Low Torque Valve 1007 to the Upper Swivel Pump-In Sub 1030 in the closed position. Stand the Swivel Tool and Ball Launch Manifold Assembly 1000 on the derrick 1. Rig up Cement Lines on rig 1 floor to be ready to be connected to the Ball Launch Manifold 1000 and also where the Drill Pipe 14 can be circulated with Rig Pumps and/or from the Cement Pump with necessary valves to isolate either set of pumps.

(6) Continue in hole 14 to cement depth.

(7) Rig up cement lines to the Swivel Manifold 1000.

(8) Circulate and condition mud with rig pumps. Rotate the Drill Pipe 18,20 while circulating.

(9) Off-Line Operations can be performed while circulating. Cementer can prepare the Spacers and Cement Mix water. The Pre-Job Task Meeting can also be conducted and cement lines tested.

(10) After the desired circulation time has been completed, keep the Drill Pipe 18,20 rotating and isolate the Rig Pumps from the Cement Pump. Set the Cement Pump to pump thru the Lower Swivel Pump-In Sub 2030. Maintain rotation of Drill Pipe 18,20.

(11) Pump the first Spacer and Cement. When pumping the second Spacer, pump the calculated volume of the Cement Stinger. Shut down the Cement Pump, close the Low Torque Valve 1008 to the Lower Swivel Pump-In Sub 2030 and open the Low Torque Valve 1007 to the Upper Swivel Pump-In Sub 1030. Open the Full Opening Ball Valve 1006, releasing the Wiper Ball or Dart 2005.

(12) Displace the Cement. When the Wiper Ball or Dart 2005 lands at the Plug Catcher shut down pumping.

(13) Store the Swivel Tool and Ball Launch Manifold Assembly 1000 back on the derrick 1.

(14) Pull Drill Pipe 20 out of hole 14, above top of cement.

(15) Rig up pump line and shear Plug catcher to the Circulation position.

(16) Pull out of hole 14.

Well Clean Out High Differential Displacement Floater Completion Swivel Tool Only (1) Pick up Bit plus Scraper and Brush assembly.

(2) Trip in hole 14, with Bit half way from Mud Line and Float Collar, pick up second Scraper/Brush assembly.

(3) Continue to Trip in hole 14, tag Float Collar.

(4) Pick up Swivel Tool 30 (but omitting right angle inlet 200). Rig up high pressure pump plus rig pumps to the Swivel Tool 30. Test lines to desired pressure.

(5) Circulate bottoms up with existing Mud System with rig pumps, rotate drill pipe 20 while circulating.

(6) Isolate the rig Pumps and test Production Casing with the high pressure pump, if not already tested.

(7) Displace the Choke, Kill and Booster lines with Seawater.

(8) Start displacing the existing Mud System with Seawater by pumping down the Drill Pipe 20 with returns up the Annulus with the High Pressure Pump. Once the Seawater has rounded the Bit and the Differential Pressure declines to a safe working pressure, switch to the Rig Pumps and finish the Displacement. (Maintain pipe 20 rotation throughout the displacement to help in removing debris from around the Tool Joints).

(9) Pull out of hole 14 until the Scraper/Brush assembly is at the Mud Line (boosting the Riser with Seawater)

(10) Trip in hole 14, space out Dual Actuated Ball Service Tool and Riser Brush to be one stand above the Dual Actuated Ball Service Tool and the Riser Brush to be at plus or minus 30 feet above the Riser Flex Joint with the Bit at the Float Collar boost riser while Trip in hole 14).

(11) Rotate pipe 20 and circulate bottoms up with seawater.

(12) Drop ball and open circulating ports in the Dual Actuated Ball Service Tool.

(13) Jet wash the Well Head and Blow Out Preventers.

(14) With the Dual Actuated Ball Service Tool above the Blow Out Preventers, function the Annular and the Pipe Rams to have annular blow out preventer attach to Tool.

(15) Jet wash the Blow Out Preventers. Pull out of hole 14 jet washing the Marine Riser. Put on the side (lay out) the Riser Brush and Dual Actuated Ball Service Tool.

(16) Trip in hole 14 to the Float Collar.

(17) Rotate pipe 20 and circulate bottoms up with seawater.

(18) Align Fail Safe Valves and Choke Manifold to take returns up the Choke and Kill Lines.

(19) Pump Spacer Trains down the drill pipe 20 with returns up the Riser. When the Spacer Trains are 75 barrels from the Blow Out Preventers, close the Annular and take returns up the Choke and Kill lines. Slow the pumps if necessary, but do not shut down until the Spacer Trains are circulated from the Hole 14.

(20) Align The Choke Manifold and Pump Riser Spacer Trains down the Choke, Kill, and Booster lines. Boost Spacer Trains from the Riser at 22 barrels per minute minimum

(21) Displace seawater from the Choke, Kill, and Booster Lines with Filtered Completion Fluid.

(22) Displace seawater from the Hole 14 with Filtered Completion Fluid. Circulate and filter until the National Turbidity Units are at the desired level.

(23) Pull out of hole 14.

Well Clean Out High Differential Displacement Floater Completion (1) Pick up Bit plus Scraper and Brush assembly.

(2) Trip in hole 14, with Bit half way from Mud Line and Float Collar, pick up second Scraper/Brush assembly.

(3) Continue Trip in hole 14, tag Float Collar.

(4) Pick up Swivel Tool/Manifold Assembly 1000 with Full Opening Ball Valve 1006 in the closed position. Rig up high pressure pump plus rig pumps to the Manifold Assembly 1000. Close the lower Low-Torque Valve 1008 and the upper Low-Torque Valve 1007. Test lines and open the lower Low Torque Valve 1008.

(5) Circulate bottoms up with existing Mud System with rig pumps, rotate Drill Pipe 18,20 while circulating.

(6) Isolate the rig Pumps and test Production Casing with the high pressure pump, if not already tested.

(7) Displace the Choke, Kill, and Booster lines with Seawater.

(8) Start displacing the existing Mud System with Seawater with the High Pressure Pump. Once the Seawater has rounded the Bit and the Differential Pressure declines to a safe working pressure, switch to the Rig Pumps and finish the displacement. (Maintain Drill Pipe 18,20 rotation throughout displacement to help in removing debris from around Tool Joints).

(9) Pull out of hole 14 until the Scraper/Brush assembly is at the Mud Line (boosting the Riser with Seawater)

(10) Trip in hole 14, space out Dual Actuated Ball Service Tool and Riser Brush to be one stand above the Dual Actuated Ball Service Tool and the Riser Brush to be at plus or minus 30 feet above the Riser Flex Joint with the Bit at the Float Collar (boost riser while Trip in hole 14).

(11) Rotate Drill Pipe 18,20 and circulate bottoms up with seawater.

(12) Drop ball 2005 and open circulating ports in the Dual Actuated Ball Service Tool.

(13) Jet wash the Well Head and Blow Out Preventers.

(14) With the Dual Actuated Ball Service Tool above the Blow Out Preventers, function the Annular and the Pipe Rams.

(15) Jet wash the Blow Out Preventers. Pull out of hole jet washing the Marine Riser. Lay down the Riser Brush and Dual Actuated Ball Service Tool.

(16) Trip in hole 14 to the Float Collar.

(17) Rotate pipe 18,20 and circulate bottoms up with seawater.

(18) Align Fail Safe Valves and Choke Manifold to take returns up the Choke and Kill lines.

(19) Pump Spacer Trains down the Drill Pipe 18,20 with returns up the Riser. When the Spacer Trains are 75 barrels from the Blow Out Preventers, close the Annular and take returns up the Choke and Kill Lines. Slow the pumps if necessary, but do not shut down until the Spacer Trains are circulated from the Hole 14.

(20) Align The Choke Manifold and Pump Riser Spacer Trains down the Choke, Kill, and Booster Lines. Boost Spacer Trains from the Riser at a minimum of 22 barrels per minute.

(21) Displace seawater from the Choke, Kill, and Booster lines with Filtered Completion Fluid.

(22) Displace seawater from the Hole 14 with Filtered Completion Fluid. Circulate and filter until the National Turbidity Units are at the desired level.

(23) Pull out of hole 14.

Tubing Conveyed Perforate Operations with Swivel Tool/Ball Drop Assembly 1000 Well Status: Well Bore has been Cleaned Up; Filtered Completion Fluid is in Place; No Block Squeeze Had to be Performed; Sump Packer has been Set on Depth with Wireline; Operations can be Performed with Omni or IRIS Valve (1) Pick up the Tubing Conveyed Perforating Bottom Hole Assembly (pressure activation as primary detonation of Tubing Conveyed Perforate Guns) plus Snap-Latch assembly. Pick up the Omni or IRIS Valve to be in the Well Test Position. Pick up a Radio Active Sub one stand above the Tubing Conveyed Perforate assembly.

(2) Trip in Hole 14 with the Tubing Conveyed Perforate assembly, limit run in speed from slip to slip at two minutes per stand (94 foot stands). Drift each stand with maximum Outer diameter Drift. Monitor hole 14 on trip tank while Trip in hole 14 for proper fluid back for pipe displacement to confirm Omni/IRIS Valve is in proper position.

(3) With Snap-Latch one stand above the Sump Packer, obtain pick-up and slack-off weights.

(4) Sting into Sump Packer. Pick up the Work String to the neutral pipe weight and mark pipe at the Rotary. Snap out, should take 10,000 k to 20,000 k to snap out. (If any doubt of being in the Sump Packer, rig up Wireline and run Gamma-Ray and Collar Log for correct correlation).

(5) Pick up Swivel Tool/Ball Drop Assembly 1000 and space out as desired to put the Swivel tool 1000 at the desired distance above the Rotary with the Snap-Latch strung into the Sump packer.

(6) Rig up Choke Manifold on the Rig 1 Floor with lines from the Swivel Tool 1000 to the Manifold and lines from the High Pressure Pump to the Manifold. Rig up lines down stream of the Choke to take returns to the trip tank and to the Mud Pits.

(7) Sting into the Sump Packer and pick up to the neutral pre-recorded pipe weight. Set the Tubing Conveyed Perforate Packer by rotating the Work String the desired number of turns and slacking off the desired pipe weight onto Tubing Conveyed Perforate packer.

(8) Open the Upper Low Torque 1007 and Full Opening Ball Valve 1006 to the Work String 20 plus Choke Manifold Valves in the open position back to the Trip Tank. Close the Annular Blow Out Preventer and test the Tubing Conveyed Perforate Packer to the Annulus side to 1,000 pounds per square inch. Monitor for returns at the Trip Tank, no returns should be observed if the Tubing Conveyed Perforate Packer is holding.

(9) Cycle the Omni Valve to the Reverse Circulating position.

(10) Break circulation by pumping down the Work String 20 with returns up the Rig Choke or Kill line.

(11) Test the Pump Lines, Choke Manifold and Swivel Tool 1000 Valve to the desired pressure. Open the top Low Torque Valve 1007 and the Full Opening Ball Valve 1006.

(12) Displace the Work String 20 with a lighter fluid, taking returns up the Rig Choke or Kill line until the desired under balance has been achieved.

(13) Cycle the Omni Valve to the Well Test Position.

(14) Pressure up the Annulus to 500 psi.

(15) Fire the Tubing Conveyed Perforate Guns by pressuring up on the Work String to the calculated detonation pressure. Bleed the pressure to 0.

(16) Monitor firing of the Guns (usually a 5 to 10 minute delay). Obtain Shut in Tubing Pressure. Calculate the difference between the estimated Bottom Hole 14 Pressure and the actual Bottom hole 14 pressure.

(17) Open the Well 14 thru the desired Positive Choke size and flow back the desired volume.

(18) Cycle the Omni Valve to the Reverse Circulating Position.

(19) Reverse out the Influx plus an additional Work String Volume.

(20) Bleed the pressure on the Annulus to 0.

(21) Open the Annular Blow Out Preventer.

(22) Start the Trip Tank Pump circulating on the Annulus. Open the By-Pass on the Tubing Conveyed Perforate Packer by picking up on the Work string. Monitor the fluid loss to the formation. If excessive losses are occurring, close the By-Pass.

(23) Pump and displace a Loss Circulation Pill of choice. Balance the Loss Circulation Pill by leaving Pill in the Work String above the Omni Valve and with Pill above the Omni Valve on the outside between the Omni and the casing.

(24) Open the By-Pass and monitor the Hole 14 on the Trip Tank. The Hole 14 should take the calculated volume of fluid from the Omni Valve to the bottom of the perforations and then become static.

(25) Close the By-Pass and Cycle the Omni Valve to the Well Test Position.

(26) Open the By-Pass and reverse out Influx that was trapped below the Omni Ball Valve.

(27) With the By-Pass in the open position, monitor the hole 14 on the Trip Tank while rigging down the Choke Manifold and pump lines.

(28) Rig down the Swivel Tool and Ball Drop assembly 1000.

(29) Make a 5 stand short trip.

(30) Circulate bottoms up.

(31) Pull out of hole. Circulate at desired stages while Pull out of hole 14 as to monitor for possible trapped or swabbed Gas.

Note: If elected, the Choke Manifold that was rigged up on the Rig Floor can be eliminated and the Rig Choke Manifold could be used instead. The flow back could be flowed back to the Trip Tank and timed with the Super Choke adjusted to obtain the desired Barrel of Oil Per Day rate. This could be done to reduce additional expense and save Rig Time.

If a Bar Drop is elected to be the primary choice of the Tubing Conveyed Perforate detonation, a Pup Joint can be easily added between the Upper Swivel 1050 and the Top Drive 10. The Full Opening Ball Valve 1006 would be closed and the Ball Valve Wrench taped. The Lower Low Torque Valve 1008 would then be used for circulation activities. Once all operations have been completed and the well is ready to be perforated, the Tape can be removed and the Bar can be dropped when intended. The tape is installed to the Ball Valve 1006 only as a safety factor so that the Bar will not be accidentally dropped prior to the contemplated drop.

The following is a list of reference numerals:

| LIST FOR REFERENCE NUMERALS | |
|---|---|
| (Part No.) Reference Numeral | (Description) Description |
| 1 | rig |
| 2 | crown block |
| 3 | cable means |
| 4 | travelling block |
| 5 | hook |
| 6 | gooseneck |

-continued

| LIST FOR REFERENCE NUMERALS | |
|---|---|
| (Part No.) Reference Numeral | (Description) Description |
| 7 | swivel |
| 8 | drilling fluid line |
| 10 | top drive unit |
| 11 | draw works |
| 12 | cable |
| 13 | rotary table |
| 14 | well bore |
| 15 | guide rail |
| 16 | support |
| 17 | support |
| 18 | drill pipe |
| 19 | drill string |
| 20 | drill string or work string |
| 30 | swivel |
| 31 | hose |
| 40 | swivel mandrel |
| 50 | upper end |
| 60 | lower end |
| 70 | box connection |
| 80 | pin connection |
| 90 | central longitudinal passage |
| 100 | shoulder |
| 101 | outer surface of shoulder |
| 102 | upper surface of shoulder |
| 110 | interior surface |
| 120 | external surface (mandrel) |
| 130 | recessed area |
| 131 | packing support area |
| 132 | packing support area |
| 140 | radial inlet ports (a plurality) |
| 145 | bearing (preferably combination 6.875 inch bearing cone, Timken Part number 67786, and 9.75 inch bearing cup bearing cup, Timken part number 67720) |
| 146 | bearing (preferably combination 7 inch bearing cone, Timken Part number 67791, and 9.75 inch bearing cup bearing cup, Timken part number 67720) |
| 150 | swivel sleeve |
| 155 | protruding section |
| 156 | shoulder |
| 157 | shoulder |
| 158 | packing support area |
| 159 | packing support area |
| 160 | upper end |
| 170 | lower end |
| 180 | central longitudinal passage |
| 190 | radial passage |
| 200 | inlet |
| 201 | arrow |
| 202 | arrow |
| 203 | arrow |
| 204 | arrow |
| 205 | peripheral groove |
| 206 | key way |
| 210 | lubrication port |
| 211 | grease injection fitting (preferably grease zerk (¼ - 28 td. in. streight, mat.-monel Alemite part number 1966-B) |
| 220 | packing port |
| 225 | injection fitting(preferably packing injection fitting (10,000 psi) Vesta - PGI Manufacturing part number PF10N4-10) (alternatively Pressure Relief Tool for packing injection fitting Vesta - PGI Manufacturing part number PRT -PIF 12-20) |
| 226 | head |
| 230 | packing port |
| 235 | injection fitting (preferably packing injection fitting (10,000 psi) Vesta - PGI Manufacturing part number PF10N4-10) (alternatively Pressure Relief Tool for packing injection fitting Vesta - PGI Manufacturing part number PRT -PIF 12-20) |

LIST FOR REFERENCE NUMERALS

| (Part No.) Reference Numeral | (Description) Description |
|---|---|
| 240 | cover |
| 250 | upper shoulder |
| 260 | lower shoulder |
| 270 | area for wiper ring |
| 271 | wiper ring (preferably Parker part number 959-65) |
| 280 | area for wiper ring |
| 281 | wiper ring (preferably Parker part number 959-65) |
| 290 | area for grease ring |
| 291 | grease ring (preferably Parker part number 2501000 Standard Polypak) |
| 300 | area for grease ring |
| 301 | grease ring (preferably Parker part number 2501000 Standard Polypak) |
| 305 | packing unit |
| 310 | packing retainer nut |
| 314 | bore for set screw |
| 315 | set screw for packing retainer nut |
| 316 | threaded area |
| 317 | set screw for receiving area |
| 320 | packing end |
| 330 | packing ring |
| 340 | packing ring |
| 350 | packing injection ring |
| 351 | transverse port |
| 352 | radial port |
| 353 | peripheral groove |
| 354 | interior groove |
| 355 | male end |
| 356 | flat end |
| 360 | packing end |
| 370 | packing ring |
| 380 | packing ring |
| 390 | packing ring |
| 400 | packing ring |
| 410 | packing end |
| 415 | packing unit |
| 420 | packing retainer nut |
| 425 | set screw for packing retainer nut |
| 430 | packing end |
| 440 | packing ring |
| 450 | packing ring |
| 460 | packing lubrication ring |
| 470 | packing end |
| 480 | packing ring |
| 490 | packing ring |
| 500 | packing ring |
| 510 | packing ring |
| 520 | packing end |
| 600 | clamp |
| 605 | groove |
| 610 | first portion |
| 620 | second portion |
| 630 | torque arm |
| 640 | torque arm |
| 650 | shackle |
| 660 | shackle |
| 670 | fastener |
| 680 | fastener |
| 690 | keyway |
| 691 | keyway |
| 700 | key |
| 710 | keyway |
| 711 | keyway |
| 720 | key |
| 730 | peripheral groove |
| 800 | retaining nut |
| 801 | threaded area |
| 810 | outer surface |
| 820 | inclined portion |
| 830 | bore |
| 840 | inner surface |
| 850 | threaded portion |
| 860 | upper surface |
| 870 | bottom surface |
| 880 | lubrication port |
| 881 | grease injection fitting (preferably grease zerk (¼ - 28 td. in. streight, mat.-monel Alemite part number 1966-B) |
| 890 | set screw |
| 900 | bore for set screw |
| 910 | receiving portion for set screw |
| 1000 | top drive swivel |
| 1001 | arrow |
| 1002 | arrow |
| 1003 | arrow |
| 1005 | stabilizing bracket |
| 1006 | intermediate valve |
| 1006B | bore |
| 1006A | valve ball |
| 1007 | valve member |
| 1008 | valve member |
| 1009 | manifold |
| 1010 | arm |
| 1030 | swivel portion |
| 1040 | mandrel |
| 1041 | lower portion of mandrel |
| 1050 | sleeve |
| 1300 | line |
| 1301 | line |
| 1302 | line |
| 2000 | valve member |
| 2001 | valve |
| 2005 | plug or ball |
| 2010 | tool |
| 2011 | upper section |
| 2012 | lower section |
| 2013 | middle section |
| 2014 | threaded section |
| 2015 | enlarged inner diameter section |
| 2016 | narrowing diameter section |
| 2018 | threaded section |
| 2019 | o-ring seal |
| 2020 | o-ring seal |
| 2021 | arrow |
| 2030 | swivel portion |
| 2040 | mandrel |
| 2041 | lower portion of mandrel |
| 2050 | sleeve |

All measurements disclosed herein are at standard temperature and pressure, at sea level on Earth, unless indicated otherwise. All materials used or intended to be used in a human being are biocompatible, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A double top drive swivel insertable into a drill or work string comprising:
   (a) a first mandrel having upper and lower end sections, the upper section being connectable to and rotatable with an upper drill or work string section, the first mandrel including a longitudinal passage;

(b) a first sleeve, the first sleeve being rotatably connected to the first mandrel (c) a first seal between upper and lower end portions of the first mandrel and first sleeve, the first seal preventing leakage of fluid between the first mandrel and first sleeve;

(d) the first sleeve comprising an inlet port (e) the first mandrel comprising at least one port in fluid communication with both the inlet port of the first sleeve and the longitudinal passage of the first mandrel to supply pressurized fluid from the inlet port of the first sleeve to the longitudinal passage of the first mandrel;

(f) a second mandrel having upper and lower end sections, the upper section being fluidly connected to the lower section of the first mandrel and the lower section of the second mandrel being connectable to and rotatable with a lower section of drill or work string section, the second mandrel including a longitudinal passage;

(g) a second sleeve having a longitudinal sleeve passage, the second sleeve being rotatably connected to the second mandrel (h) a second seal between upper and lower end portions of the second mandrel and second sleeve, the second seal preventing leakage of fluid between the second mandrel and second sleeve;

(i) the second sleeve comprising an inlet port (j) the second mandrel comprising at least one port in fluid communication with both the inlet port of the second sleeve and the longitudinal passage of the second mandrel to supply pressurized fluid from the inlet port of the second sleeve to the longitudinal passage of the second mandrel; and (k) a valve fluidly connecting the longitudinal passages of the first and second mandrels.

2. The double top drive swivel of claim 1, further comprising a stabilizer connected to the first and second swivels.

3. The double top drive swivel of claim 1, wherein the first mandrel and first sleeve further comprise a first peripheral recess, the first peripheral recess being located between the first plurality of spaced bearings and being in fluid communication with the inlet port of the first sleeve and the plurality of spaced apart radial inlet ports of the first mandrel.

4. The double top drive swivel of claim 1, wherein the second mandrel and second sleeve further comprise a second peripheral recess, the second peripheral recess being located between the second plurality of spaced bearings and being in fluid communication with the inlet port of the second sleeve and the plurality of spaced apart radial inlet ports of the second mandrel.

5. The double top drive swivel of claim 1, wherein the first sleeve includes a clamp, the clamp being detachably connected to the first sleeve.

6. The double top drive swivel of claim 1, wherein the second sleeve includes a clamp, the clamp being detachably connected to the first sleeve.

7. The double top drive swivel of claim 1, further comprising a ball, the ball being held in place by the valve when the valve is in a closed condition.

8. The double top drive swivel of claim 7, wherein the ball can pass through the valve when the valve in placed in an open condition.

9. The double top drive swivel of claim 1, further comprising an inlet manifold fluidly connected to the inlet port of the first sleeve and the inlet port of the second sleeve, the manifold having a first condition where fluid is allowed to pass only through to the inlet portion of the first sleeve and a second condition where fluid is allowed to pass only through the inlet port of the second sleeve.

10. The double top drive swivel of claim 9, wherein the manifold includes a third condition wherein fluid is not allowed to pass through either inlet port of the first or second sleeves.

11. The double top drive swivel of claim 9, wherein the manifold includes a third condition where fluid is allowed to pass through both inlet ports of the first and second sleeves.

12. The double top drive swivel of claim 11, wherein the manifold includes a fourth condition where fluid is allowed to pass through both inlet ports of the first and second sleeves.

13. A method of using a double top drive swivel insertable into a drill or work string, the method comprising the steps of:

(a) providing a double top drive swivel, the double swivel comprising:

(i) a first mandrel having upper and lower end sections, the upper section being connectable to and rotatable with an upper drill or work string section, the first mandrel including a longitudinal passage;

(ii) a first sleeve, the first sleeve being rotatably connected to the first mandrel (iii) a first seal between upper and lower end portions of the first mandrel and first sleeve, the first seal preventing leakage of fluid between the first mandrel and first sleeve;

(iv) the first sleeve comprising an inlet port positioned between the first plurality of spaced bearings;

(v) the first mandrel comprising at least one port in fluid communication with both the inlet port of the first sleeve and the longitudinal passage of the first mandrel to supply pressurized fluid from the inlet port of the first sleeve to the longitudinal passage of the first mandrel;

(vi) a second mandrel having upper and lower end sections, the upper section being fluidly connected to the lower section of the first mandrel and the lower section of the second mandrel being connectable to and rotatable with a lower section of drill or work string section, the second mandrel including a longitudinal passage;

(vii) a second sleeve having a longitudinal sleeve passage, the second sleeve being rotatably connected to the second mandrel by a plurality of longitudinally spaced bearings;

(viii) a second seal between upper and lower end portions of the second mandrel and second sleeve, the second seal preventing leakage of fluid between the second mandrel and second sleeve;

(ix) the second sleeve comprising an inlet port positioned between the second plurality of spaced bearings;

(x) the second mandrel comprising at least one port in fluid communication with both the inlet port of the second sleeve and the longitudinal passage of the second mandrel to supply pressurized fluid from the inlet port of the second sleeve to the longitudinal passage of the second mandrel; and (xi) a valve fluidly connecting the longitudinal passages of the first and second mandrels;

(b) fluidly attaching the double swivel to a top drive unit and to a drill string which;

(c) placing a ball to be dropped above the valve specified in step "a"; and (d) opening the valve to let the ball drop into the drill string.

14. The method of claim 13, further comprising the step of performing an open hole cement plug.

15. The method of claim 13, further comprising the step of using a plug catcher for catching the ball dropped.

16. The method of claim 13, further comprising the step of cleaning out a well using a high differential displacement floater.

17. The method of claim 13, wherein the ball is flexible.

18. The method of claim 17, wherein the ball is comprised of rubber.

19. The method of claim 13, wherein the valve in step "a" is a ball valve comprising a valve ball having a longitudinal passage, and the ball in step "c" is placed inside the longitudinal passage of the valve ball.

20. The method of claim 13, wherein the valve in step "a" is a ball valve comprising a valve ball having a longitudinal passage, and the ball in step "c" is placed above the longitudinal passage of the valve ball.

\* \* \* \* \*